(12) United States Patent
Park

(10) Patent No.: US 12,550,188 B2
(45) Date of Patent: Feb. 10, 2026

(54) METHOD AND DEVICE FOR TRANSMITTING OR RECEIVING DATA IN UNLICENSED BAND

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 299 days.

(21) Appl. No.: 17/438,138

(22) PCT Filed: Aug. 10, 2020

(86) PCT No.: PCT/KR2020/010551
§ 371 (c)(1),
(2) Date: Sep. 10, 2021

(87) PCT Pub. No.: WO2021/029638
PCT Pub. Date: Feb. 18, 2021

(65) Prior Publication Data
US 2022/0167404 A1    May 26, 2022

(30) Foreign Application Priority Data

Aug. 14, 2019   (KR) .................. 10-2019-0099918
Jul. 28, 2020   (KR) .................. 10-2020-0094066

(51) Int. Cl.
*H04W 74/0808*  (2024.01)
*H04W 16/14*  (2009.01)

(52) U.S. Cl.
CPC ....... *H04W 74/0808* (2013.01); *H04W 16/14* (2013.01)

(58) Field of Classification Search
CPC ......... H04W 74/0808; H04W 74/0816; H04W 74/0866; H04W 74/006; H04W 74/0841;
(Continued)

(56) References Cited

U.S. PATENT DOCUMENTS 11,553,521 B2 *  1/2023  Li ..................... H04W 72/23
2016/0344526 A1  11/2016  Fan et al.
(Continued)

FOREIGN PATENT DOCUMENTS

CA    3088465 A1    7/2019
EP    3927077 A1    12/2021
(Continued)

OTHER PUBLICATIONS

Etri, "Wideband operation for NR-U", R1-1907036, 3GPP TSG RAN WG1 Meeting #97, Reno, USA, May 13-17, 2019.
(Continued)

*Primary Examiner* — Un C Cho
*Assistant Examiner* — Rasha K Fayed
(74) *Attorney, Agent, or Firm* — IP Legal Services, LLC

(57) ABSTRACT

Provided are a method and a device for transmitting or receiving data in an unlicensed band. The method may include receiving configuration information including a parameter for configuring multiple resource block sets in an unlicensed band from a base station; identifying the multiple resource block sets on the basis of the configuration information; and transmitting or receiving data to or from the base station through at least one resource block set determined on the basis of a result which is obtained by performing listen before talk (LBT) on each of the multiple resource block sets, and is received from the base station.

6 Claims, 19 Drawing Sheets

(58) Field of Classification Search
CPC ........... H04W 74/0833; H04W 74/008; H04W 16/14; H04W 72/0453; H04W 72/23; H04W 72/541; H04W 72/04; H04W 72/042; H04W 72/044; H04W 72/0413; H04W 72/085; H04W 72/21; H04W 72/542; H04W 72/1273; H04W 72/0446; H04W 28/16; H04L 5/0007; H04L 5/0012; H04L 5/001; H04L 5/0044; H04L 5/0053; H04L 5/0066; H04L 5/0016; H04L 5/0094; H04L 5/0092; H04L 5/0023; H04L 5/0091; H04L 5/0078; H04L 5/0062; H04L 5/0055; H04L 27/0006; H04L 27/2607; H04L 27/2602; H04L 27/26025; H04L 27/0004; H04L 27/0601; H04L 27/2613; H04L 41/0806; H04L 1/1854; H04L 1/1861; H04L 1/1819; H04B 1/715; H04B 2001/7154
See application file for complete search history.

(56) References Cited

U.S. PATENT DOCUMENTS

| | | | |
|---|---|---|---|
| 2019/0021045 A1* | 1/2019 | Kim | H04W 72/23 |
| 2019/0069256 A1* | 2/2019 | Jung | H04W 56/0015 |
| 2019/0253200 A1* | 8/2019 | Salem | H04W 74/0808 |
| 2019/0261356 A1* | 8/2019 | Myung | H04W 48/12 |
| 2020/0228178 A1* | 7/2020 | Mittal | H04B 7/0478 |
| 2020/0236710 A1* | 7/2020 | Sun | H04L 5/0016 |
| 2020/0275417 A1* | 8/2020 | Takeda | H04L 5/14 |
| 2020/0288507 A1* | 9/2020 | Chang | H04L 5/0094 |
| 2020/0329496 A1* | 10/2020 | Li | H04W 72/1273 |
| 2020/0383089 A1* | 12/2020 | Goto | H04W 72/04 |
| 2020/0383095 A1* | 12/2020 | Moon | H04L 5/001 |
| 2021/0014011 A1* | 1/2021 | Xiong | H04L 1/1887 |
| 2021/0058964 A1* | 2/2021 | Hooli | H04W 74/008 |
| 2021/0099259 A1* | 4/2021 | Salem | H04W 74/0816 |
| 2021/0168801 A1* | 6/2021 | Wang | H04W 72/23 |
| 2021/0185675 A1* | 6/2021 | Shi | H04W 74/0808 |
| 2021/0251005 A1* | 8/2021 | Pan | H04L 1/0071 |
| 2021/0288852 A1* | 9/2021 | Jia | H04L 27/26025 |
| 2022/0039158 A1* | 2/2022 | Awadin | H04W 72/23 |
| 2022/0061094 A1* | 2/2022 | Jung | H04W 74/0816 |
| 2022/0104258 A1 | 3/2022 | Moon et al. | |
| 2022/0225411 A1* | 7/2022 | Axnäs | H04W 74/0833 |
| 2022/0240319 A1* | 7/2022 | Kim | H04W 16/28 |
| 2022/0264377 A1* | 8/2022 | Lei | H04W 72/0453 |
| 2024/0276542 A1* | 8/2024 | Lyer | H04L 5/0092 |

FOREIGN PATENT DOCUMENTS

| | | |
|---|---|---|
| WO | 2019/105255 A1 | 6/2019 |
| WO | 2019/137777 A1 | 7/2019 |

OTHER PUBLICATIONS

Moderator (LG Electronics), "Summary#2 on maintenance of wideband operation for NR-U", R1-2004702, 3GPP TSG RAN WG1 #101, e-Meeting, May 25-Jun. 5, 2020.

European Patent Office, Office Action of corresponding EP Patent Application No. 20853322.4, Jul. 27, 2023.

Nokia et al., "On wideband operation in NR-U", R1-1906657, 3GPP TSG RAN WG1 Meeting #97, Reno, Nevada, USA, May 13-17, 2019.

Vivo, "Discussion on physical UL channel design in unlicensed spectrum", R1-1812299, 3GPP TSG RAN WG1 Meeting #95, Spokane, US, Nov. 12-16, 2018.

European Patent Office, European Search Report of corresponding EP Patent Application No. 20853322.4, Sep. 23, 2022.

Nokia et al., "Channel bandwidths for NR-U", R4-1906011, 3GPP TSG-RAN WG4 Meeting #90bis, Reno, Nevada, USA, May 13-May 17, 2019.

Vivo, "Discussion on wideband operation in NR-U", R1-1906134, 3GPP TSG RAN WG1#97, Reno, USA, May 13-17, 2019.

Huawei et al., "UL channels and signals in NR unlicensed band", R1-1903927, 3GPP TSG RAN WG1 Meeting #96bis, Xi'an, China, Apr. 8-12, 2019.

Huawei et al., "NRU wideband BWP operation", R1-1903932, 3GPP TSG RAN WG1 Meeting #96bis, Xi'an, China, Apr. 8-12, 2019.

Vivo, "Discussion on physical UL channel design in unlicensed spectrum", R1-1906129, 3GPP TSG RAN WG1 #97, Reno, USA, May 13-17, 2019.

Ericsson, "channel raster design of Rel-16 NR-U for 5GHz band", R4-1906624, 3GPP TSG-RAN4 Meeting #91, Reno, USA, May 13-17, 2019.

* cited by examiner

METHOD AND DEVICE FOR TRANSMITTING OR RECEIVING DATA IN UNLICENSED BAND

CROSS REFERENCE TO RELATED APPLICATIONS

This application is a National Stage Patent Application of PCT International Patent Application No. PCT/KR2020/010551 (filed on Aug. 10, 2020) under 35 U.S.C. § 371, which claims priority to Korean Patent Application Nos. 10-2019-0099918 (filed on Aug. 14, 2019) and 10-2020-0094066 (filed on Jul. 28, 2020), the teachings of which are incorporated herein in their entireties by reference.

TECHNICAL FIELD

The embodiments relates to methods and devices for transmitting and receiving data in an unlicensed band in a next-generation wireless access network (hereinafter, "new radio (NR)").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

Accordingly, there is a demand for a design for transmitting and receiving data between a base station and a terminal using an unlicensed band in NR.

DETAILED DESCRIPTION OF THE INVENTION

Technical Problem

Embodiments of the disclosure may provide a method and device for configuring one or more subbands in an unlicensed band and transmitting and receiving data based on a Listen Before Talk (LBT) result for one or more subbands configured.

Technical Solution

In an aspect, there may be provided a method for transmitting/receiving data in an unlicensed band by a user equipment (UE). The method may include receiving configuration information comprising a parameter for configuring a plurality of resource block sets in the unlicensed band, checking the plurality of resource block sets based on the configuration information, and transmitting/receiving data to and from the base station through at least one resource block set determined based on a result of performing a Listen Before Talk (LBT) operation for each of the plurality of resource block sets received from the base station.

In another aspect, there may be provided a method for transmitting/receiving data in an unlicensed band by a base station. The method may include transmitting configuration information comprising a parameter for configuring a plurality of resource block sets in the unlicensed band, transmitting a result of performing a Listen Before Talk (LBT) operation for each of the plurality of resource block sets, and transmitting/receiving the data to and from a user equipment (UE) through at least one resource block set determined based on the result of performing the LBT operation. Each of the plurality of resource block sets are configured with the number of resource block determined based on the configuration information.

In another aspect, there may be provided a user equipment (UE) for transmitting/receiving data in an unlicensed band. The UE may include a transmitter configured to transmit data to a base station, a receiver configured to receive, from the base station, configuration information comprising a parameter for configuring a plurality of resource block sets in the unlicensed band, and a controller configured to check the plurality of resource block sets based on the configuration information. The receiver receives the data from the base station through at least one resource block set determined based on a result of performing a Listen Before Talk (LBT) operation for each of the plurality of resource block sets received from the base station, and the transmitter transmits the data to the base station through the at least one resource block set.

In another aspect, there may be provided a base station for transmitting/receiving data in an unlicensed band. The base station may include a receiver configured to receive data from a user equipment (UE), a transmitter configured to transmit configuration information comprising a parameter for configuring a plurality of resource block sets in the unlicensed band, transmit a result of performing a Listen Before Talk (LBT) operation for each of the plurality of resource block sets, and transmit the data to the UE through at least one resource block set determined based on the result of performing the LBT operation and a controller configured to perform the LBT operation for each of the plurality of resource block sets. Each of the plurality of resource block sets are configured with the number of resource block determined based on the configuration information.

Advantageous Effects

According to embodiments of the disclosure, there may be provided a method and device capable of for configuring one or more subbands in an unlicensed band and transmitting and receiving data based on a Listen Before Talk (LBT) result for one or more subbands configured.

MODE FOR CARRYING OUT THE INVENTION

Figure 1:
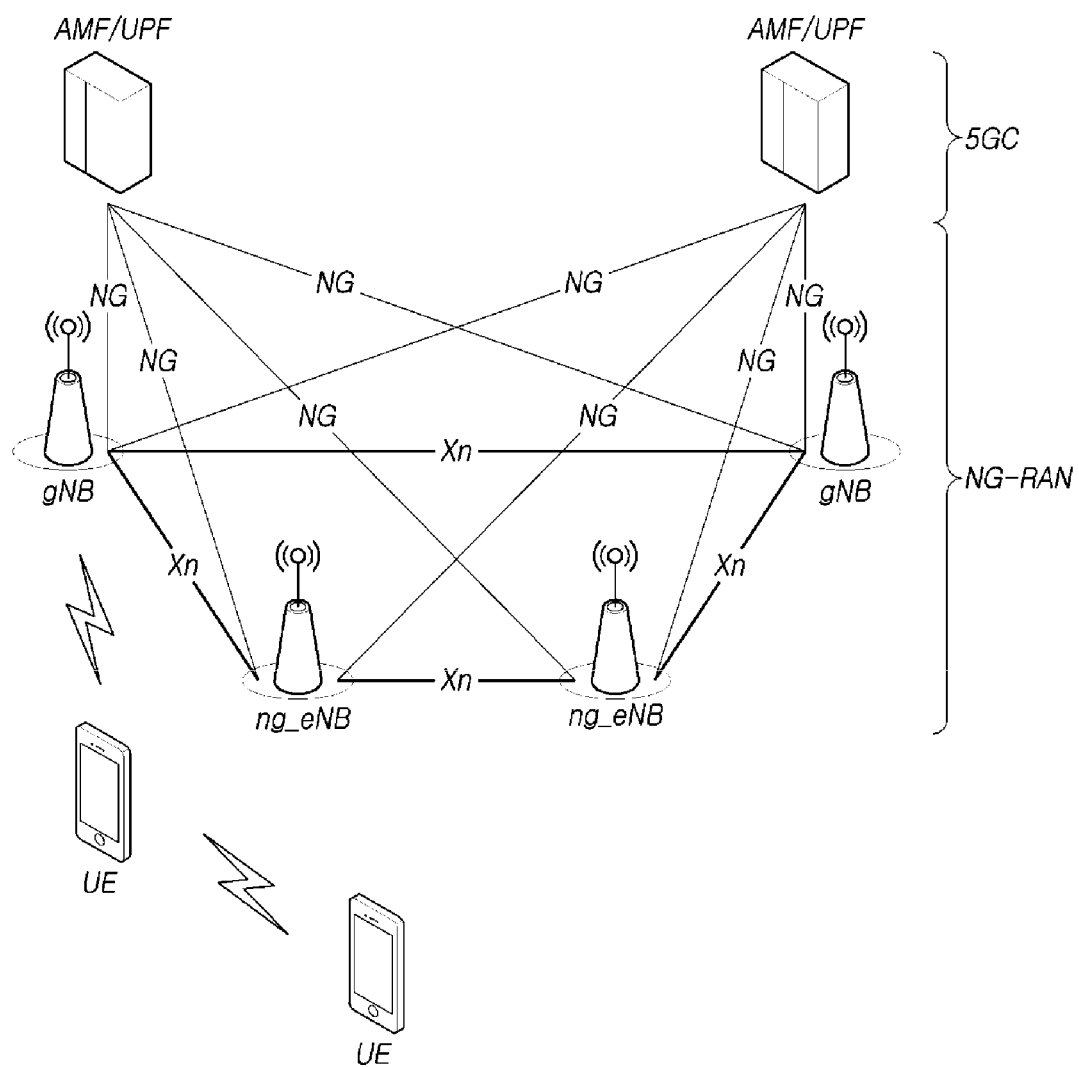
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the locational relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, Wi-Fi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
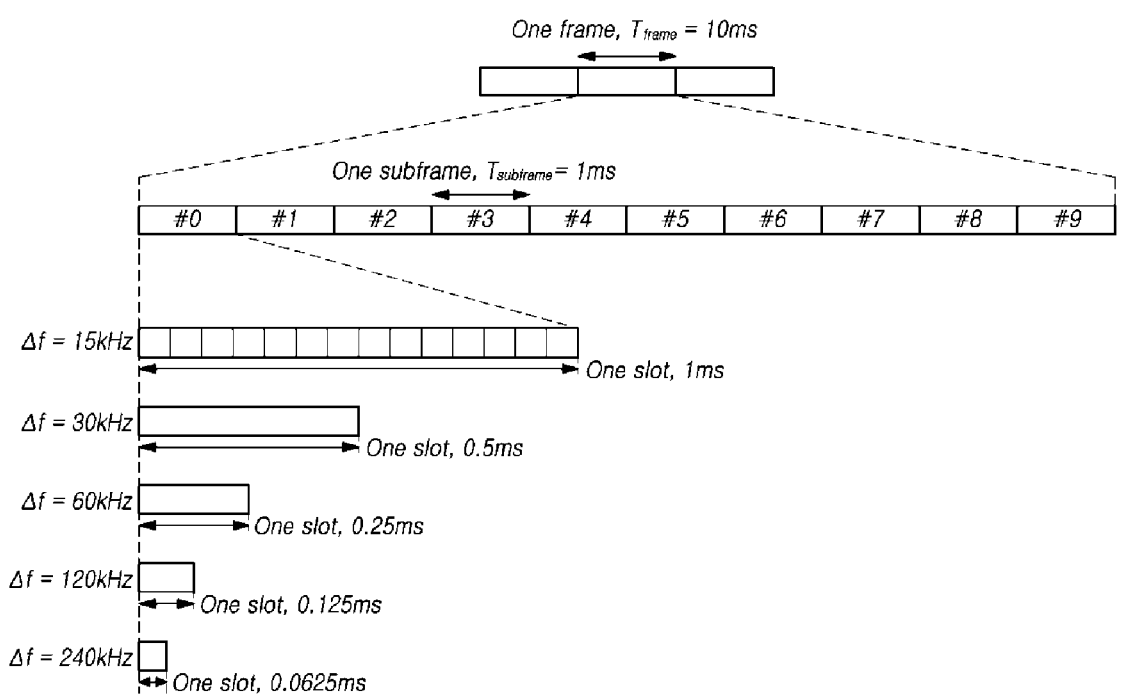
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
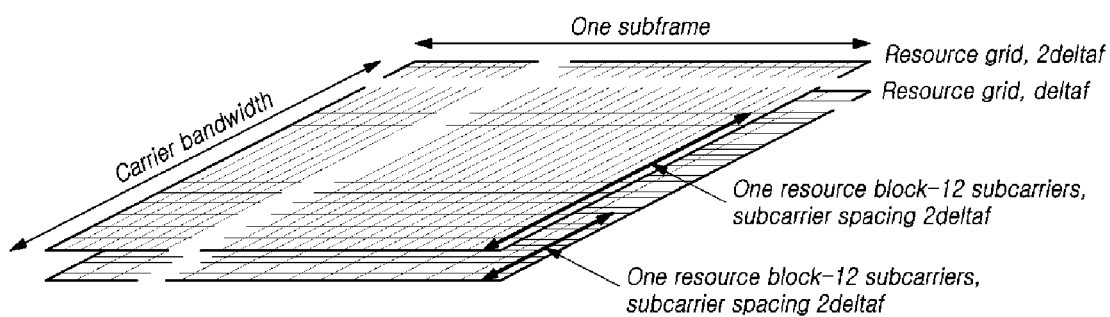
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
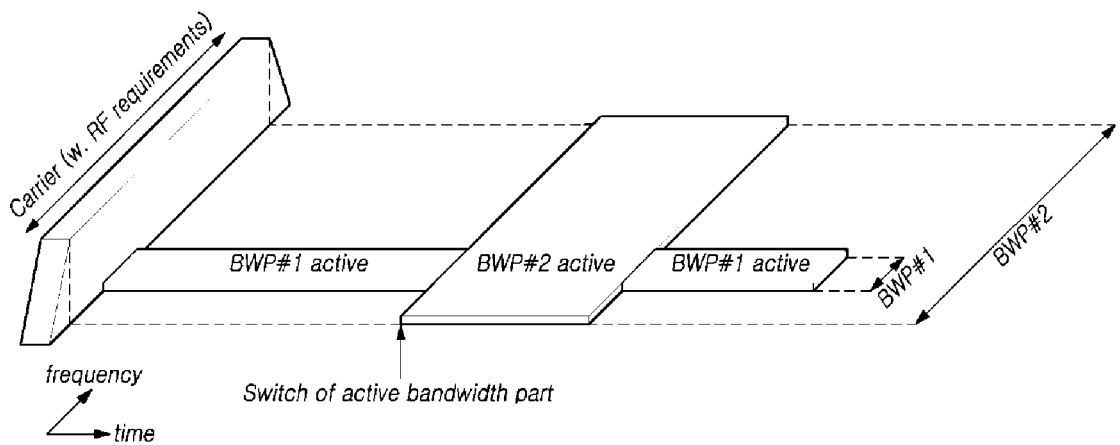
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
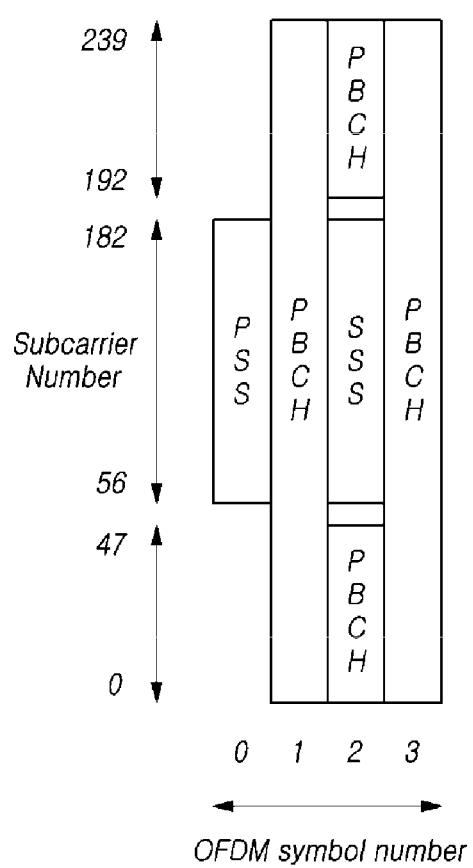
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency location for monitoring the SSB. A carrier raster and a synchronization raster, which are the center frequency location information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the location of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the location of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
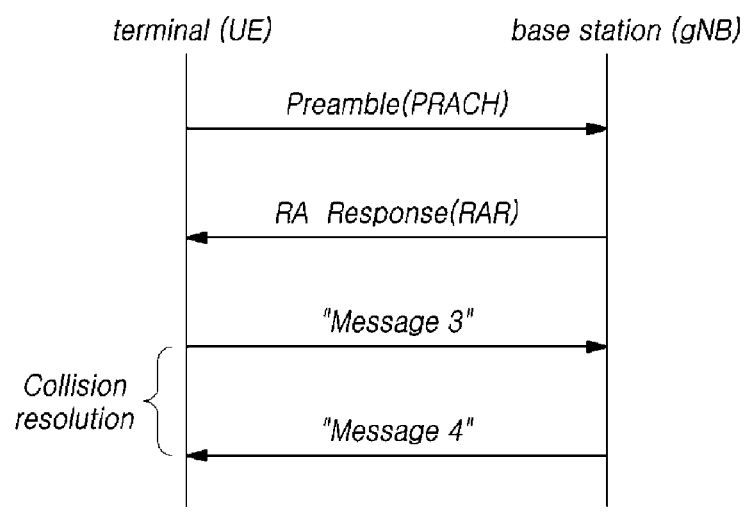
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
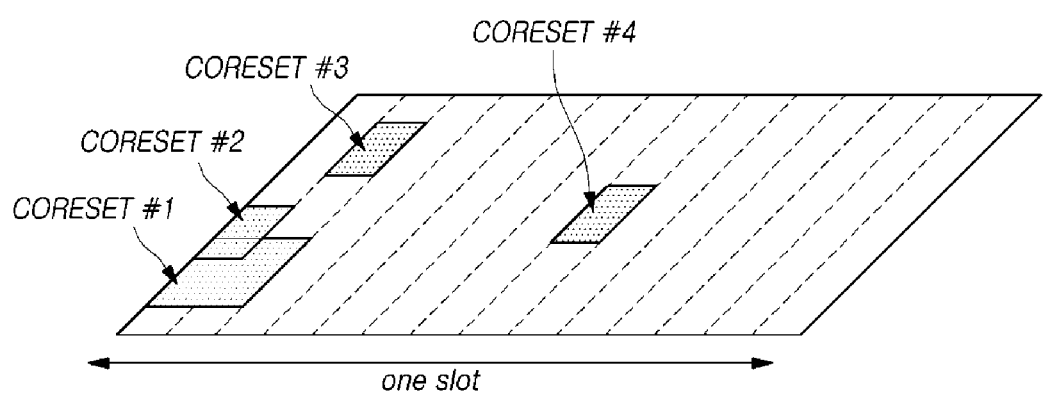
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

Further, a bandwidth configured as a predetermined frequency section in a carrier bandwidth is denoted a bandwidth part or BWP below, but the disclosure is not limited to such terms. Further, although a bandwidth configured as a predetermined frequency section in a bandwidth part is denoted a subband, but the disclosure is not limited to the terms.

Further, the term "subband configuration information" used below is an arbitrary term meaning pieces of information necessary for configuring a subband, but is not limited thereto. The subband configuration information may be interchangeably used with other various terms indicating the same meaning. Likewise, LBT operation configuration information means information needed when the UE performs the LBT operation and may be interchangeably used with other various terms indicating the same meaning.

For ease of description, the LBT (Listen Before Talk) operation is described as an example of technology for coexistence of wireless communication technologies in an unlicensed band. However, the disclosure is applicable to other various co-existence techniques. Of course, the disclosure may apply not only to 5G or NR technology, which is a next-generation wireless communication technology, but also to 4G, Wi-Fi, or other various wireless communication technologies.

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra-reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
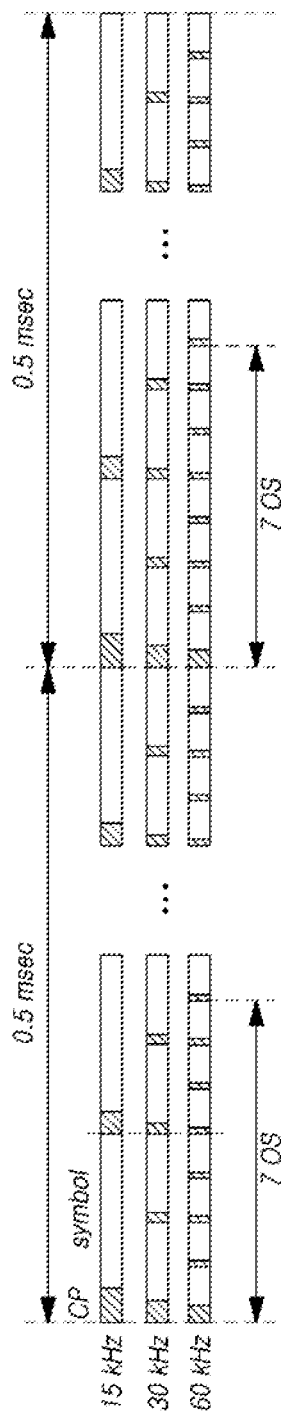
FIG. 8 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

PDCCH

The NR and LTE/LTE-A system transmits and receives, via the PDCCH, L1 control information, such as downlink (DL) allocation, downlink control information (DCI), and uplink (UL) grant DCI. As a resource unit for transmission of the PDCCH, a control channel element (CCE) is defined. In NR, the control resource set (CORESET) is the frequency/time resource for PDCCH transmission and may be configured in each UE. Further, each CORESET may be configured of one or more search spaces constituted of one or more PDCCH candidates for the UE to monitor the PDCCH.

Physical Resources

A physical resource for NR may be configured to be flexible compared to LTE. A Common Resource Block (CRB) is defined from point A, which is a reference point of a frequency radio resource unit of an NR cell, and a BWP configuration for transmission and reception of an UE is made based on CRB. In addition, when a plurality of SCSs are supported in a cell, a configuration for each subcarrier spacing-specific carrier bandwidth may also be made. In addition, PRB and VRB, which are units of radio resource allocation for an UE are configured for each BWP configured for the UE.

For details related to the NR physical resource configuration method, refer to the content of 3GPP TS 38.211 document.

Wider Bandwidth Operations

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a typical LTE UE supports a transmission/reception capability of a bandwidth of 20 MHz for a single LTE CC.

Figure 9:
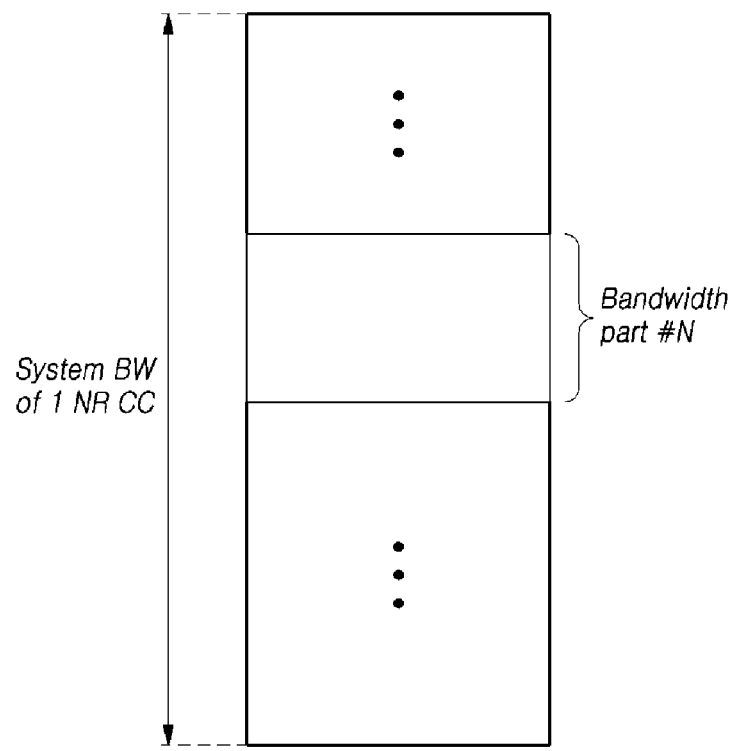
FIG. 9 is a view schematically illustrating a bandwidth part to which embodiments of the present disclosure may be applied.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

NR-U (NR-Unlicensed Spectrum)

Unlike licensed bands, unlicensed bands are wireless channels that are allowed to be used by any provider or person in order to provide wireless communication services within the regulations of respective countries, instead of being exclusively used by a specific provider. Accordingly, it is required to solve i) a problem caused by co-existence with various short-range wireless communication protocols, such as Wi-Fi, Bluetooth, NFC, or the like, which is provided through unlicensed bands and ii) a problem caused by co-existence of NR providers and LTE providers when providing NR services through the corresponding unlicensed bands.

Therefore, in order to avoid interference or collision between the respective wireless communication services when providing NR services through the unlicensed band, it is necessary to support an LBT (listen before talk)-based wireless channel access scheme. In the LBT based wireless channel access scheme, a power level of a wireless channel or a carrier is sensed before transmitting a radio signal in order to determine whether or not the wireless channel or the carrier is available. In this case, if a specific wireless channel or carrier of the unlicensed band is in use by another wireless communication protocol or another provider, the NR services through the corresponding band will be limited, so that the QoS requested by the user may not be guaranteed in the wireless communication services through the unlicensed band, compared to the wireless communication services through the licensed band.

Further, where some wideband NR-U cell is configured via an unlicensed band, coexistence with other RAT needs to be considered to increase the access probability for the NR-U cell. In this case, the DL or UL BWP configured for any UE in the NR-U cell or the system bandwidth of a NR-U cell is divided into subbands, the LBT is performed in the corresponding subband unit, and a design for a wireless protocol for radio signal transmission in the subband unit is needed.

In the present disclosure, a frequency bandwidth that is a unit of LBT for transmission of a base station or a UE in an NR-U cell is referred to as a subband, but the present disclosure is not limited by the name. For example, the frequency bandwidth as a unit of the LBT may be referred to as another name, such as a LBT bandwidth or a channel access bandwidth. In addition, in the present disclosure below, an arbitrary value is 'signaled by the base station', 'configured through signaling of the base station', or 'signaled from the base station' means that the corresponding value is configured through the UE-specific or UE-group common or cell-specific RRC signaling, MAC control element signaling (MAC CE signaling), or physical layer control signaling (L1 control signaling).

Hereinafter, a method for transmitting and receiving data in an unlicensed band will be described in detail with reference to the accompanying drawings.

Figure 10:
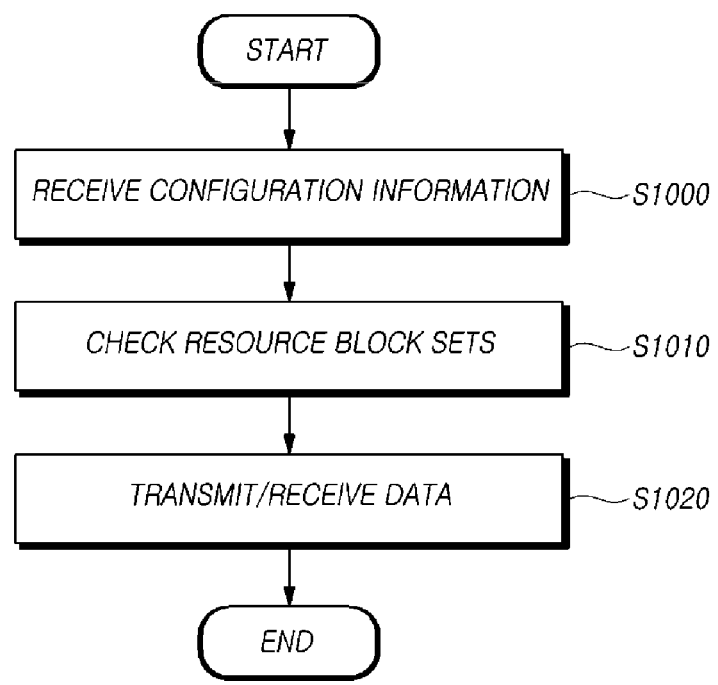
FIG. 10 is a flowchart illustrating a procedure for transmitting uplink data in an unlicensed band by a UE according to an embodiment.

FIG. 10 is a flowchart illustrating a procedure for transmitting data in an unlicensed band by a UE according to an embodiment.

Referring to FIG. 10, the UE may receive configuration information including a parameter for configuring a plurality of resource block sets in the unlicensed band at S1000.

In NR, a bandwidth part (BWP) may be configured for each UE for transmission/reception of uplink or downlink radio physical channels and physical signals for the UE. The UE may activate one bandwidth part among the configured bandwidth parts and transmit/receive data. Since a wideband of 100 MHz or more is possible as the system bandwidth constituting the NR cell, the bandwidth of one BWP for a UE may be configured as a wideband of 100 MHz or more.

Meanwhile, for any node to transmit a radio signal in an unlicensed band, an LBT is first performed to identify whether the corresponding radio channel is occupied by another node. Thus, for PDSCH transmission for the UE in the NR-U cell in the unlicensed band, the base station performs an LBT on the frequency band in which the corresponding NR-U cell is configured. If the corresponding frequency band is empty, the base station may perform PDCCH and hence PDSCH transmission. Likewise, for the UE to perform uplink signal transmission, the UE needs to first perform an LBT on the uplink radio channel.

An NR-U cell may be configured for data transmission and reception in an unlicensed band. In this case, the system bandwidth of the cell may be configured to be greater than 20 MHz Or, when bandwidth parts are configured in an unlicensed band in the NR-U cell, the bandwidth of the DL BWP or UL BWP for a UE may be configured to be larger than 20 MHz. In this case, if an LBT is performed in BWP units and data transmission/reception is performed, the competitivity in light of channel access probability may be significantly degraded as compared with other radio access technology (RAT), e.g., Wi-Fi, which performs an LBT in 20 MHz units. Accordingly, it is necessary to increase the channel access probability by configuring one or more subbands having a bandwidth with respect to the system bandwidth or the BWP of the NR-U cell.

In the present disclosure, one subband is composed of a set of a predetermined number of resource blocks corresponding to a bandwidth, and one subband may also be referred to as a resource block set. However, this term is not limited to a specific term as long as it corresponds to a frequency band composed of a plurality of resource blocks to which the technical idea of the present disclosure can be applied as an example.

According to an embodiment, the configuration of a resource block set, that is, a subband may be configured in units of DL BWP or UL BWP configured for an UE. For the BWP configured for the UE, the subband may be implicitly configured according to the configuration information of each BWP. For example, a plurality of subbands constituting each BWP may be configured based on frequency resource allocation information and a subcarrier spacing (SCS) value configured for each BWP.

That is, the configuration information including parameters for configuring a plurality of resource block sets in the unlicensed band may include guard band configuration information for configuring at least one guard band in the unlicensed band. The guard band configuration information may include SCS information of the bandwidth part configured in the unlicensed band. In this case, the guard band configuration information may include SCS information for each of at least one bandwidth part configured for the UE in the unlicensed band. Alternatively, information on the size of the bandwidth part may be further included in the guard band configuration information.

Each of the bandwidth parts configured for the UE may include a plurality of subbands and at least one guard band configured between each subband to distinguish each subband. Accordingly, the number of guard bands included in one bandwidth part is one less than the number of subbands included in the same bandwidth.

According to an embodiment, resource blocks (PRBs) constituting each of at least one guard band may be determined based on the SCS information of a bandwidth part including the guard band. Alternatively, the resource block sets and the resource blocks constituting the guard bands may be determined according to the SCS information of the bandwidth part and the size information of the bandwidth part.

If the number of resource blocks constituting the subband determined based on the SCS information of the bandwidth part and the size information of the bandwidth part is N, each of the plurality of subbands may be composed of N resource blocks. In addition, if the number of resource blocks constituting the guard band determined based on the SCS information of the bandwidth part and the size information of the bandwidth part is M, each of the at least one guard band may include M resource blocks.

In this case, according to an example, a plurality of subbands for each bandwidth part may be sequentially configured from the lowest resource block constituting the corresponding bandwidth part. That is, the lowermost subband in the corresponding bandwidth part may be composed of N resource blocks from resource block #0 to resource block #(N−1). Accordingly, the lowermost guard band in the corresponding bandwidth part may be composed of M resource blocks from blocks #N to #(N+M−1).

The subband composed of N resource blocks and a guard band composed of M resource blocks are alternately configured, and the last subband in the corresponding bandwidth part may be composed of N or less than N resource blocks.

As an example, a plurality of subbands constituting the bandwidth part may include a lowest subband and a highest subband composed of a number of resource blocks less than N as described above. That is, subbands excluding two subbands located at upper and lower edges of the bandwidth part may be configured with N resource blocks.

According to an example, the number of resource blocks of each of the plurality of subbands constituting the bandwidth part may be configured (e.g., informed or indicated) by signaling of the base station. That is, the configuration information may include the number of resource blocks constituting a plurality of subbands. In addition, the number of resource blocks constituting the guard band may also be configured (e.g., informed or indicated) by signaling of the base station.

Alternatively, the number of resource blocks constituting the guard band and the index of the starting resource block, which is the lowest resource block among the resource blocks constituting each guard band, are configured (e.g., informed or indicated) by the signaling of the base station, and accordingly, the subband may be configured between the guard bands.

According to another example, the subband configuration may be configured in a system bandwidth unit in which the corresponding NR-U cell is configured, or in a carrier bandwidth unit for each numerology, regardless of the bandwidth part configuring for any UE. For example, the subband configuration may be configured based on a common resource block (CRB) from point A of the system bandwidth.

In this case, the guard band configuration information may include SCS information of the system bandwidth configured in the unlicensed band. Alternatively, the guard band configuration information may further include information on the size of the system bandwidth. Alternatively, according to another example, the guard band configuration information may include the subcarrier spacing information of a subcarrier spacing specific (SCS-specific) carrier bandwidth. Alternatively, the guard band configuration information may further include information on the size of the corresponding bandwidth.

According to an embodiment, the common resource blocks constituting each of at least one guard band may be determined based on the SCS information of a system bandwidth. Alternatively, the common resource blocks constituting each of the at least one guard band may be determined based on the SCS information of the system bandwidth and the size of the system bandwidth.

If the number of common resource blocks constituting the subband determined based on the SCS information of the system bandwidth is R, each of the plurality of subbands may be composed of R common resource blocks. In addition, if the number of common resource blocks constituting the guard band determined based on the SCS information of the system bandwidth is S, each of the at least one guard band may be composed of S common resource blocks.

In this case, according to an embodiment, a plurality of subbands for the system bandwidth may be sequentially configured from the lowest resource block corresponding to the point A. That is, the lowermost subband in the corresponding system bandwidth may be composed of R resource blocks from resource block #0 to resource block #(R−1). Accordingly, the lowermost guard band in the corresponding system bandwidth may be composed of S resource blocks from blocks #R to #(R+S−1).

The subband composed of R resource blocks and the guard band composed of S resource blocks are alternately configured, and the last subband in the corresponding system bandwidth may be composed with R resource blocks or less resource blocks than R.

As an example, a plurality of subbands constituting the system bandwidth may include a lowest subband and a highest subband configured with a smaller number of resource blocks than the aforementioned R. That is, subbands excluding two subbands located at the upper and lower edges of the system bandwidth may be composed of R resource blocks.

Alternatively, according to an embodiment, the number of resource blocks of each of the plurality of subbands constituting the system bandwidth may be configured (e.g., informed or indicated) by signaling of the base station. That is, the configuration information may include the number of resource blocks constituting a plurality of subbands. In addition, the number of resource blocks constituting the guard band may also be configured (e.g., informed or indicated) by signaling of the base station.

Alternatively, the number of the common resource blocks constituting the guard band and the index of the starting common resource block, which is the lowest common resource block among common resource blocks constituting each guard band, may be configured by the signaling of the base station. That is, the number of starting common resource blocks and resource blocks of at least one guard band within the system bandwidth may be indicated according to the RRC signaling or the like. Accordingly, a plurality of subbands may be configured between each guard band.

According to another embodiment, resource blocks constituting each of at least one guard band may be determined based on the SCS information of an SCS-specific carrier bandwidth. Alternatively, the resource blocks constituting each of the at least one guard band may be determined based on the SCS information of the SCS-specific carrier bandwidth and the size of the SCS-specific carrier bandwidth.

If the P value is the number of resource blocks constituting a subband determined based on the SCS information of the SCS specific carrier bandwidth, each of the plurality of subbands may be composed of P resource blocks. In addition, if the number of resource blocks constituting a guard band determined based on the SCS information of the SCS-specific carrier bandwidth is Q, each of at least one guard band may be composed of Q resource blocks.

In this case, according to an example, a plurality of subbands for the SCS-specific carrier bandwidth may be sequentially configured from the lowest resource block of the corresponding bandwidth. That is, the lowermost subband in the corresponding SCS-specific carrier bandwidth may be composed of P resource blocks from resource block #0 to resource block #(P−1). Accordingly, the lowermost guard band in the corresponding SCS-specific carrier bandwidth may be composed of Q resource blocks from blocks #P to #(P+Q−1).

The subband composed of P resource blocks and the guard band composed of Q resource blocks are alternately configured, and the last subband in the corresponding system bandwidth may be composed of P or less resource blocks than the P value.

As an example, a plurality of subbands constituting the SCS-specific carrier bandwidth may include a lowest subband and a highest subband composed of less resource blocks than the aforementioned P. That is, subbands excluding two subbands located at upper and lower edges of the SCS specific carrier bandwidth may be configured as P resource blocks.

Alternatively, according to an embodiment, the number of resource blocks of each of a plurality of subbands constituting the SCS-specific carrier bandwidth may be configured by signaling of the base station. That is, the configuration information may include the number of resource blocks constituting a plurality of subbands. In addition, the number of resource blocks constituting the guard band may also be configured by signaling of the base station.

Alternatively, the number of resource blocks constituting the guard band and the index of the starting resource block, which is the lowest resource block among the resource blocks constituting each guard band, may be configured by the signaling of the base station. That is, the number of starting resource blocks and resource blocks of at least one guard band within the SCS specific carrier bandwidth may be indicated according to the RRC signaling or the like. Accordingly, a plurality of subbands may be configured between each guard band.

However, in the above example, the number of resource blocks constituting each subband and each guard band, N, M, R, S, P, Q values may be configured the same or different for each subband or guard band. In addition, when a plurality of methods of configuring subbands are possible, the method for configuring a subband to be applied may be indicated from the base station to the UE.

Referring back to FIG. 10, the UE may check the plurality of resource block sets based on the configuration information at S1010.

When a plurality of subbands are configured based on the SCS information of the bandwidth part configured for the UE, the UE may acquire the SCS information of the bandwidth part included in the configuration information. The UE may check the number of resource blocks constituting the subband or the guard band, respectively, based on the corresponding SCS information. Accordingly, the UE may configure the plurality of subbands for the activated bandwidth part based on the corresponding number of resource blocks.

This can be equally applied even when the number of resource blocks constituting a subband or a guard band is determined based on the SCS information of the system bandwidth or the SCS specific carrier bandwidth.

When the number of resource blocks constituting the subband or guard band and the index of the starting resource block are configured by the signaling of the base station, the UE may check the resource blocks constituting each of the subband and the guard band included in the configuration information.

Referring back to FIG. 10, the UE may transmit/receive data to and from the base station through at least one resource block set determined based on a result of performing a Listen Before Talk (LBT) for each of the plurality of resource block sets received from the base station at S1020.

As described above, when the plurality of subbands are configured for any one of the bandwidth part, the system bandwidth, or the SCS-specific carrier bandwidth, the base station may perform the LBT in units of the corresponding subbands. That is, in the present disclosure, the subband may mean an LBT bandwidth corresponding to a unit in which the LBT is performed on the frequency axis or domain. Accordingly, resource allocation for DL BWP and transmission/reception of PDCCH or PDSCH may be performed on a per-subband basis.

For example, the base station may perform LBT for each of a plurality of subbands and configure a bitmap indicating the LBT performance result. That is, the base station may transmit the LBT result (e.g., success/failure) for each subband for downlink transmission to the UE through a UE-group common PDCCH. The UE may receive downlink control information including the corresponding bitmap from the base station.

In this case, the size of the bitmap may be determined based on the number of subbands. For example, it is assumed that the bitmap constituting the UE-group common DCI consists of L bits.

When the plurality of subbands are configured for the bandwidth part, the L value may be determined by the number of subbands constituting the corresponding BWP for each BWP set for the UE, the k value. For example, the LBT result for each subband may be indicated in a 1:1 correspondence with the bits of the corresponding bitmap. That is, it may be determined as L=k.

When the plurality of subbands are configured for the system bandwidth, the L value may be determined by the number of subbands constituting the system bandwidth from point A, the m value. For example, the LBT result for each subband may be indicated in a 1:1 correspondence with the bits of the corresponding bitmap. That is, it may be determined as L=m.

When the plurality of subbands are configured for the SCS-specific carrier bandwidth, the L value may be determined by the number of subbands constituting the SCS-specific carrier bandwidth, the n value. For example, the LBT result for each subband may be indicated in a 1:1 correspondence with the bits of the corresponding bitmap. That is, it may be determined as L=n.

Alternatively, according to another embodiment, the bitmap size configured through the corresponding UE-group common DCI, the L value, and the location information of bits corresponding to the plurality of subbands configured for the UE may be all signaled by the base station.

The UE may receive scheduling information for at least one subband resource determined based on the LBT performance result from the base station. The UE may receive downlink data from the base station or transmit uplink data to the base station based on the corresponding scheduling information.

According to an embodiment, it will be assumed that there is allocated a resource for transmission and reception of data in a frequency band including one guard band among at least one guard band and two resource block sets having one guard band among a plurality of resource block sets therebetween so that each of the plurality of resource block sets is distinguished in the unlicensed band. That is, resource allocation for data transmission/reception may be performed for a band including two subbands and a guard band therebetween. In this case, the UE is able to transmit and receive the data with the base station in the frequency band only when the LBT for the two resource block sets is all successful. That is, only when the LBT result for the two subbands interposed between the guard bands is successful, data transmission and reception may be performed through the corresponding guard bands.

According to the above-mentioned embodiment, it is possible to provide a method and apparatus for configuring one or more subbands in the unlicensed band, and transmitting and receiving the data based on the LBT result for the configured one or more subbands. By so doing, the UE may prevent a reduction in data transmission probability that may arise as the LBT is performed in a wide frequency area and meet the data transmission QoS using the unlicensed band.

Hereinafter, operations of the base station, related to the above-described UE operations, will be described with reference to the accompanying drawings.

Figure 11:
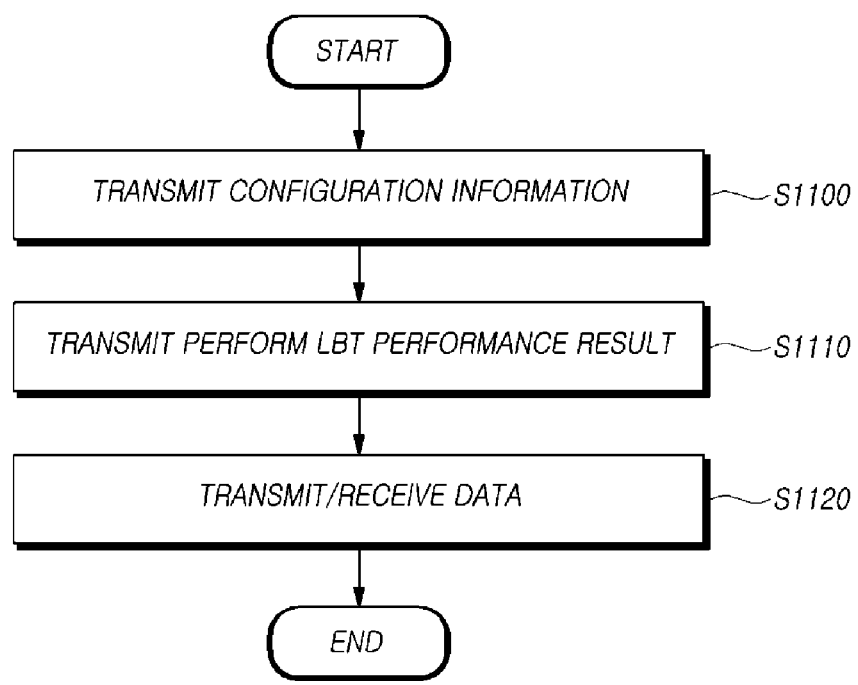
FIG. 11 is a flowchart illustrating a procedure for receiving data in an unlicensed band by a base station according to an embodiment.

FIG. 11 is a flowchart illustrating a procedure for receiving uplink data in an unlicensed band by a base station according to an embodiment.

Referring to FIG. 11, the base station may transmit configuration information including a parameter for configuring a plurality of resource block sets in the unlicensed band at S1100.

According to an embodiment, the configuration of a resource block set, that is, a subband may be configured in units of DL BWP or UL BWP configured for an UE. For the BWP configured for the UE, the subband may be implicitly configured according to the configuration information of each BWP. For example, a plurality of subbands constituting each BWP may be configured based on frequency resource allocation information and a subcarrier spacing (SCS) value configured for each BWP.

That is, the configuration information including parameters for configuring a plurality of resource block sets in the unlicensed band may include guard band configuration information for configuring at least one guard band in the unlicensed band. The guard band configuration information may include SCS information of the bandwidth part configured in the unlicensed band. In this case, the guard band configuration information may include SCS information for each of at least one bandwidth part configured for the UE in the unlicensed band. Alternatively, information on the size of the bandwidth part may be further included in the guard band configuration information.

Each of the bandwidth parts configured for the UE may include a plurality of subbands and at least one guard band configured between each subband to distinguish each subband. Accordingly, the number of guard bands included in one bandwidth part is one less than the number of subbands included in the same bandwidth.

According to an embodiment, resource blocks (PRBs) constituting each of at least one guard band may be determined based on the SCS information of a bandwidth part including the guard band. Alternatively, the resource block sets and the resource blocks constituting the guard bands may be determined according to the SCS information of the bandwidth part and the size information of the bandwidth part.

If the number of resource blocks constituting the subband determined based on the SCS information of the bandwidth part and the size information of the bandwidth part is N, each of the plurality of subbands may be composed of N resource blocks. In addition, if the number of resource blocks constituting the guard band determined based on the SCS information of the bandwidth part and the size information of the bandwidth part is M, each of the at least one guard band may include M resource blocks.

In this case, according to an embodiment, a plurality of subbands for each bandwidth part may be sequentially configured from the lowest resource block constituting the corresponding bandwidth part. That is, the lowermost subband in the corresponding bandwidth part may be composed of N resource blocks from resource block #0 to resource block #(N−1). Accordingly, the lowermost guard band in the corresponding bandwidth part may be composed of M resource blocks from blocks #N to #(N+M−1).

The subband composed of N resource blocks and a guard band composed of M resource blocks are alternately configured, and the last subband in the corresponding bandwidth part may be composed of N resource blocks or less resource blocks than N.

As an example, a plurality of subbands constituting the bandwidth part may include a lowest subband and a highest subband composed of resource blocks less than N as described above. That is, subbands excluding two subbands located at upper and lower edges of the bandwidth part may be configured with N resource blocks.

According to an embodiment, the number of resource blocks of each of the plurality of subbands constituting the bandwidth part may be configured by signaling of the base station. That is, the configuration information may include the number of resource blocks constituting a plurality of subbands. In addition, the number of resource blocks constituting the guard band may also be configured by signaling of the base station.

Alternatively, the number of resource blocks constituting the guard band and the index of the starting resource block, which is the lowest resource block among the resource blocks constituting each guard band, are configured by the signaling of the base station. Accordingly, the subband may be configured between the guard bands.

According to another embodiment, the subband configuration may be configured in a system bandwidth unit in which the corresponding NR-U cell is configured, or in a carrier bandwidth unit for each numerology, regardless of the bandwidth part configuring for any UE. For example, the subband configuration may be configured based on a common resource block (CRB) from point A of the system bandwidth.

In this case, the guard band configuration information may include SCS information of the system bandwidth configured in the unlicensed band. Alternatively, the guard band configuration information may further include information on the size of the system bandwidth. Alternatively, according to another embodiment, the guard band configuration information may include the subcarrier spacing information of a subcarrier spacing specific (SCS-specific) carrier bandwidth. Alternatively, the guard band configuration information may further include information on the size of the corresponding bandwidth.

According to an embodiment, the common resource blocks constituting each of at least one guard band may be determined based on the SCS information of a system bandwidth. Alternatively, the common resource blocks constituting each of the at least one guard band may be determined based on the SCS information of the system bandwidth and the size of the system bandwidth.

If the number of common resource blocks constituting the subband determined based on the SCS information of the system bandwidth is R, each of the plurality of subbands may be composed of R common resource blocks. In addition, if the number of common resource blocks constituting the guard band determined based on the SCS information of the system bandwidth is S, each of the at least one guard band may be composed of S common resource blocks.

In this case, according to an embodiment, a plurality of subbands for the system bandwidth may be sequentially configured from the lowest resource block corresponding to the point A. That is, the lowermost subband in the corresponding system bandwidth may be composed of R resource blocks from resource block #0 to resource block #(R−1). Accordingly, the lowermost guard band in the corresponding system bandwidth may be composed of S resource blocks from blocks #R to #(R+S−1).

The subband composed of R resource blocks and the guard band composed of S resource blocks are alternately configured, and the last subband in the corresponding system bandwidth may be composed R resource blocks or less resource blocks than R.

As an example, a plurality of subbands constituting the system bandwidth may include a lowest subband and a highest subband configured with a smaller number of resource blocks than the aforementioned R. That is, subbands excluding two subbands located at the upper and lower edges of the system bandwidth may be composed of R resource blocks.

Alternatively, according to an embodiment, the number of resource blocks of each of subbands constituting the system bandwidth may be configured (e.g., indicated, informed) by signaling of the base station. That is, the configuration information may include the number of resource blocks constituting a plurality of subbands. In addition, the number of resource blocks constituting the guard band may also be configured (e.g., indicated, informed) by signaling of the base station.

Alternatively, the number of the common resource blocks constituting the guard band and the index of the starting common resource block, which is the lowest common resource block among common resource blocks constituting each guard band, may be configured (e.g., informed, indicated) by the signaling of the base station. That is, the number of starting common resource blocks and resource blocks of at least one guard band within the system bandwidth may be indicated according to the RRC signaling or the like. Accordingly, a plurality of subbands may be configured between each guard band.

According to another embodiment, resource blocks constituting each of at least one guard band may be determined based on the SCS information of an SCS-specific carrier bandwidth. Alternatively, the resource blocks constituting each of the at least one guard band may be determined based on the SCS information of the SCS-specific carrier bandwidth and the size of the SCS-specific carrier bandwidth.

If P is the number of resource blocks constituting a subband determined based on the SCS information of the SCS specific carrier bandwidth, each of the plurality of subbands may be composed of P resource blocks. In addition, if the number of resource blocks constituting a guard band determined based on the SCS information of the SCS-specific carrier bandwidth is Q, each of at least one guard band may be composed of Q resource blocks.

In this case, according to an example, a plurality of subbands for the SCS-specific carrier bandwidth may be sequentially configured from the lowest resource block of the corresponding bandwidth. That is, the lowermost subband in the corresponding SCS-specific carrier bandwidth may be composed of P resource blocks from resource block #0 to resource block #(P−1). Accordingly, the lowermost guard band in the corresponding SCS-specific carrier bandwidth may be composed of Q resource blocks from blocks #P to #(P+Q−1).

The subband composed of P resource blocks and the guard band composed of Q resource blocks are alternately configured, and the last subband in the corresponding system bandwidth may be composed of P resource blocks or less resource blocks than P.

As an example, a plurality of subbands constituting the SCS-specific carrier bandwidth may include a lowest subband and a highest subband composed of less resource blocks than the aforementioned P. That is, subbands excluding two subbands located at upper and lower edges of the SCS specific carrier bandwidth may be configured as P resource blocks.

Alternatively, according to an embodiment, the number of resource blocks of each of subbands constituting the SCS-specific carrier bandwidth may be configured (e.g., informed or indicated) by signaling of the base station. That is, the configuration information may include the number of resource blocks constituting a plurality of subbands. In addition, the number of resource blocks constituting the guard band may also be configured (e.g., informed or indicated) by signaling of the base station.

Alternatively, the number of resource blocks constituting the guard band and the index of the starting resource block, which is the lowest resource block among the resource blocks constituting each guard band, may be configured (e.g., informed or indicated) by the signaling of the base station. That is, the number of starting resource blocks and resource blocks of at least one guard band within the SCS specific carrier bandwidth may be indicated according to the RRC signaling or the like. Accordingly, a plurality of subbands may be configured between each guard band.

Referring back to FIG. 11, the base station may transmit a result of performing a Listen Before Talk (LBT) for each of the plurality of resource block sets at S1110.

As described above, when the plurality of subbands are configured for any one of the bandwidth part, the system bandwidth, or the SCS-specific carrier bandwidth, the base station may perform LBT in units of the corresponding subbands. That is, in the present disclosure, the subband may mean an LBT bandwidth corresponding to a unit in which the LBT is performed on the frequency axis or domain.

As described above, in order to transmit a radio signal from any node in the unlicensed band, the LBT process for checking whether the radio channel is occupied by another node may be preferentially performed. Accordingly, in order to transmit a PDSCH for an UE in the NR-U cell of the unlicensed band configured by a certain NR base station, the base station must perform the LBT for the frequency band in which the NR-U cell is configured. As a result of performing the LBT, when the radio channel of the unlicensed band is empty, the base station may transmit the PDCCH and the PDSCH accordingly to the UE.

For example, the base station may perform the LBT for each of a plurality of subbands and configure a bitmap indicating the LBT performance result. That is, the base station may transmit the LBT result (e.g., success/failure) for each subband for downlink transmission to the UE through a UE-group common PDCCH. The UE may receive downlink control information including the corresponding bitmap from the base station.

In this case, the size of the bitmap may be determined based on the number of a plurality of subbands. For example, it is assumed that the bitmap constituting the UE-group common DCI consists of L bits.

When the plurality of subbands are configured for the bandwidth part, the L value may be determined by the number of subbands constituting the corresponding BWP for each BWP set for the UE, the k value. For example, the LBT result for each subband may be indicated in a 1:1 correspondence with the bits of the corresponding bitmap. That is, it may be determined as L=k.

When the plurality of subbands are configured for the system bandwidth, the L value may be determined by the number of subbands constituting the system bandwidth from point A, the m value. For example, the LBT result for each subband may be indicated in a 1:1 correspondence with the bits of the corresponding bitmap. That is, it may be determined as L=m.

When the plurality of subbands are configured for the SCS-specific carrier bandwidth, the L value may be determined by the number of subbands constituting the SCS-specific carrier bandwidth, the n value. For example, the LBT result for each subband may be indicated in a 1:1 correspondence with the bits of the corresponding bitmap. That is, it may be determined as L=n.

Alternatively, according to another embodiment, the bitmap size and the L value configured through the corresponding UE-group common DCI and the location information of bits corresponding to the plurality of subbands configured for the UE may be all signaled by the base station.

Referring back to FIG. 11, the base station may transmit/receive the data to and from a user equipment (UE) through at least one resource block set determined based on the result of performing the LBT at S1120.

The base station may transmit, to the UE, scheduling information for at least one subband resource determined based on the LBT performance result from the base station. That is, the base station may transmit downlink data through at least one subband in which the LBT operation is successful. The base station may transmit the downlink data to the UE based on the corresponding scheduling information.

According to the above-mentioned embodiment, it is possible to provide a method and apparatus for configuring one or more subbands in the unlicensed band and transmitting and receiving the data based on the LBT result for the configured one or more subbands. By so doing, the UE may prevent a reduction in data transmission probability that may arise as the LBT is performed in a wide frequency area and meet the data transmission QoS using the unlicensed band.

The above-described operations of the UE and base station are merely some embodiments, and more various embodiments may be performed in the corresponding operation and step.

In addition, although the above description is based on the downlink transmission of the base station, the uplink transmission of the UE may be substantially the same as long as it does not go against the technical idea.

In this case, in the case of uplink transmission in the unlicensed band in NR, an embodiment in which the LBT is performed by the UE will be described below in detail.

For the UE to perform uplink signal transmission, the UE needs to first perform LBT on the uplink radio channel. Thus, the UE needs to first perform the LBT upon transmitting the PUSCH for uplink data transmission. The UE may not transmit the scheduling control information received from the base station, i.e., unable to transmit the corresponding PUSCH at the time indicated by the UL grant DCI format, depending on whether the corresponding LBT succeeds. In other words, upon an LBT failure, PUSCH transmission by the corresponding UL grant may fail.

As an example, in NR, for the HARQ ACK/NACK feedback timing for the UE's PDSCH reception, the base station may configured it via RRC signaling or may indicate, to the corresponding UE, via downlink allocation DCI (DL allocation DCI). However, in the case of the above-described NR-U cell for the unlicensed band, it may be impossible to transmit the PUCCH including the HARQ ACK/NACK feedback information at the time indicated by the base station according to the result of the LBT by the UE. In other words, where an LBT failure, which is the case where the corresponding radio channel is occupied by another node, occurs as a result of the LBT, the UE fails to transmit the HARQ ACK/NACK feedback information according to the PDSCH reception at the time indicated by the base station. Such a defect may seriously degrade the HARQ performance in the NR-U cell.

Figure 12:
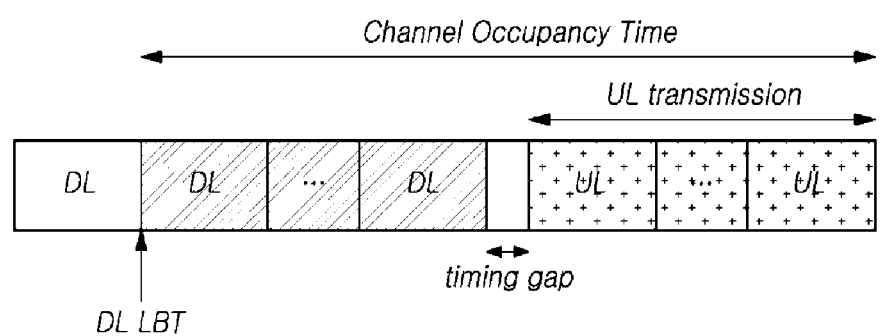
FIG. 12 is a diagram for explaining an LBT operation for wireless communication in the unlicensed band according to an embodiment of the present disclosure.

FIG. 12 is a diagram for explaining LBT for wireless communication in the unlicensed band according to an embodiment of the present disclosure. For example, it may be defined that a base station instructs a UE to perform the listen before talk (LBT) at the time of PUCCH transmission resource allocation or PUSCH transmission resource allocation, or at the corresponding PUCCH transmission or PUSCH transmission for the UE. The UE may transmit UCI (Uplink Control Information) such as HARQ ACK/NACK feedback information or CQI/CSI reporting information to the base station through the PUCCH or the PUSCH. In this regard, in NR, time resources and frequency resources, which are PUCCH resources for transmitting the HARQ feedback, may be instructed by the base station through the uplink assignment DCI or the uplink grant DCI. Alternatively, the PUCCH resource for transmitting the HARQ feedback may be semi-statically configured via RRC signaling. In particular, in the case of time resources, a timing gap value between the PDSCH reception slot and the corresponding HARQ feedback information transmission slot, may be transmitted to the UE through the DL assignment DCI or the RRC signaling.

The PUCCH resource for the CQI/CSI reporting may also be allocated to the UE through the DL assignment DCI or the RRC signaling.

Referring to FIG. 12, dashed lines show that the downlink transmission is performed through the unlicensed band at the later point when the downlink LBT (DL LBT) for the downlink transmission is successful in the base station. For example, the downlink transmission may be transmission of a downlink channel or transmission of a downlink signal indicating the uplink transmission. For example, the downlink transmission DL and the uplink transmission UL may correspond to i) PDSCH transmission and PUCCH transmission for the HARQ feedback thereto, ii) DCI for requesting the CQI/CSI reporting and PUCCH for the reporting thereof, or iii) DCI for transmitting uplink scheduling information for PUSCH and PUSCH transmission therefor. In this case, the timing gap occurs between the downlink transmission DL and the uplink transmission UL.

For example, when the downlink signal or the downlink channel according to downlink transmission indicates the PUCCH transmission in an NR-U cell of the unlicensed band, the UE basically performs the listen before talk (LBT) for the PUCCH transmission preferentially according to the regulation of the unlicensed spectrum and determines whether to transmit the PUCCH at the point indicated according to the result of the LBT. If the corresponding radio channel is occupied by another node as the result of the LBT, that is, if an LBT failure occurs, the corresponding UE may not be able to perform the PUCCH transmission at the indicated time.

However, if a channel occupancy time (COT) of the base station includes the DL assignment DCI transmission slot including the PUCCH resource allocation information and the PUCCH transmission indication information or the PDSCH transmission slots according to the corresponding DL assignment DCI, and the PUCCH transmission slot thereto, the PUCCH transmission may be performed in the corresponding UE without performing the LBT. It is because that the unlicensed band is already occupied for the downlink transmission to the UE by the base station, and not occupied by another node. That is, according to the configuration of the COT and the value of the K1, which is a timing gap value between the PDSCH reception slot and the corresponding HARQ feedback information transmission slot, of the base station, the HARQ feedback transmission over the PUCCH is possible without performing the listen before talk (LBT) at the corresponding UE.

Similarly, it may be assumed that a timing gap value between i) a slot to which the DL assignment DCI is transmitted and ii) slots in which the PUCCH including the CQI/CSI reporting information is transmitted is M. When the CSI/CQI reporting via the PUCCH is indicated through the DL assignment DCI, the CQI/CSI reporting over the PUCCH is possible without LBT at the corresponding UE according to the configuration of the COT and the value of the M of the base station.

Similar to the case of the PUCCH, it may be assumed that a timing gap value between i) a slot to which the UL grant DCI is transmitted and ii) slots in which the PUSCH is transmitted is K2. The value of the time gap K2 may be semi-statically configured via RRC signaling or dynamically configured via the UL grant DCI by the base station. Also in this case, when the channel occupancy time (COT) of the base station includes the UL grant DCI transmission slot including the PUSCH resource allocation information and the PUSCH transmission slot thereto, the PUSCH transmission may be performed in the corresponding UE without performing the LBT operation.

In this regard, according to an embodiment of the present disclosure, a base station may configure an LBT scheme for performing the LBT operation when transmitting the PUCCH or the PUSHC at a UE, and the base station may instruct it to the UE. For example, the LBT scheme may be divided into a plurality of schemes according to at least one of whether to perform the LBT operation, whether to perform a random back off procedure, and a random backoff time. In this disclosure, the method of performing the LBT operation is referred to as an 'LBT scheme', but is not limited thereto. The LBT scheme for performing the LBT operation may be variously referred to as the LBT category, but the disclosure is not limited thereto.

For example, the LBT scheme may include a first LBT scheme that does not perform the LBT operation, a second LBT scheme that performs the LBT operation but does not perform the random back off procedure, a third LBT scheme in which the LBT operation and the random back off procedure are performed but the off-time interval is fixed, and a fourth LBT scheme in which the LBT operation and the random back off procedure are performed but the off-time interval is variable.

For example, the base station may directly instruct the UE whether to perform the LBT operation for the uplink transmission through physical layer (L1) control signaling. Specifically, the LBT indication information for instructing whether to perform the LBT operation for the uplink transmission of the UE may be defined to be included within the DL assignment DCI format for transmitting the PDSCH scheduling control information.

For example, the LBT indication information may be 1-bit indication information bit. In this case, it is possible to define whether or not to perform the LBT operation at the corresponding UE according to the bit value (0, 1) of the LBT indication information when the UE corresponding to the DL assignment DCI format transmits the PUCCH. In this case, the bit value of the LBT indication information may mean to distinguish the first LBT scheme from the remaining LBT schemes among the LBT schemes described above.

As another example, the LBT indication information may be 2-bit indication information. In this case, it is possible to define whether or not to perform the LBT operation at the corresponding UE according to the bit value (00, 01, 10, and 11) of the LBT indication information when the UE corresponding to the DL assignment DCI format transmits the PUCCH. In this case, the bit value of the LBT indication information may mean to identify the first LBT scheme to the fourth LBT scheme among the LBT schemes described above.

In this case, the PUCCH transmission of the UE corresponding to the above described DL assignment DCI format may be the PUCCH transmission for the HARQ feedback information transmission of the UE according to the PDSCH reception of the UE based on the corresponding DL assignment DCI format. The PUCCH transmission of the UE corresponding to the DL assignment DCI format may be the PUCCH transmission for the CQI/CSI reporting when the CQI/CSI reporting is triggered by the corresponding DL assignment DCI format.

The LBT indication information may be defined to be included within the UL grant DCI format for transmitting the PUSCH scheduling control information.

For example, the LBT indication information may be 1-bit indication information bit. In this case, it is possible to define whether or not to perform the LBT at the corresponding UE according to the bit value (0, 1) of the LBT indication information when the UE corresponding to the UL grant DCI format transmits the PUCCH. In this case, the bit value of the LBT indication information may mean to distinguish the first LBT scheme from the remaining LBT schemes among the LBT schemes described above.

As another example, the LBT indication information may be 2-bit indication information. In this case, it is possible to define whether or not to perform the LBT operation at the corresponding UE according to the bit value (00, 01, 10, and 11) of the LBT indication information when the UE corresponding to the UL grant DCI format transmits the PUCCH. In this case, the bit value of the LBT indication information may mean to identify the first LBT scheme to the fourth LBT scheme among the LBT schemes described above.

In this case, the PUCCH transmission of the UE corresponding to the above described UL grant DCI format may be the PUCCH transmission for the uplink data transmission or the UCI transmission.

According to another embodiment, it will be defined that whether to perform the LBT scheme for the uplink transmission in the UE or the type of LBT scheme may be determined based on the timing gap value between the downlink transmission indicating the uplink transmission and the corresponding uplink transmission as shown in FIG. 12.

For example, if the timing gap value is smaller than a threshold value, it is possible to define that the indicated PUCCH or PUSCH may be transmitted without performing the LBT operation at the corresponding UE. Alternatively, if the timing gap value is greater than the corresponding threshold, it is possible to define that the corresponding PUCCH or PUSCH may be transmitted after the LBT operation is performed at the corresponding UE.

For example, the threshold may be determined by the COT value in the corresponding NR-U, or the threshold may be configured based on either cell-specific RRC signaling, UE-specific RRC signaling according to the COT by the base station, or the cell-specific RRC signaling or the UE-specific RRC signaling regardless of the COT by the base station.

In addition, the threshold may be defined as a single threshold for each uplink transmission case, or the threshold may be defined as a threshold different from each other and then configured through the specific RRC signaling or the UE-specific RRC signaling.

According to the above procedure, it is possible to determine the LBT scheme to be performed in order to transmit the uplink signal in the unlicensed band and to transmit the uplink signal in the unlicensed band according to the determined LBT scheme.

As described above, in NR, a bandwidth part (BWP) may be configured for each UE for transmission/reception of uplink or downlink radio physical channels and physical signals for the UE, and one BWP is activated and used. Further, since a wideband of 100 MHz or more is possible as the system bandwidth constituting the NR cell according to the frequency range (FR) where the corresponding NR cell is configured, unlike in LTE, the bandwidth of one BWP for a UE may thus be configured as a wideband of 100 MHz or more. In contrast, in the case where the DL or UL BWP for a UE in the NR-U cell configured via an unlicensed spectrum is larger than 20 MHz, when an LBT may be performed in the corresponding BWP unit and uplink or downlink transmission/reception is thus performed, the competitivity in light of channel access probability may be severely degraded as compared with other RATs, e.g., Wi-Fi, which perform an LBT in 20 MHz units.

To address this issue, such a method may be considered where a DL or UL BWP configured for a UE may be partitioned into subbands with a bandwidth, and an LBT is performed in the corresponding subband unit, and an uplink/downlink control channel and data channel is transmitted/ received. In other words, the BWP configured in the UE may be constituted of N subbands.

For example, it may be defined that where the bandwidth of the DL BWP configured for a UE on downlink is 80 MHz, the corresponding DL BWP may be divided into four subbands each having a bandwidth of 20 MHz, and resource allocation and its resultant PDCCH or PDSCH transmission/reception is possible in the corresponding subband unit. A similar definition may be made for uplink as well. For example, it may be defined that where the bandwidth of a UL BWP is 60 MHz, the corresponding UL BWP may be divided into three subbands each having a bandwidth of 20 MHz, and resource allocation and its resultant PUCCH or PUSCH transmission/reception is possible in the corresponding subband unit.

The present disclosure introduces a method for configuring a band which is a unit of the LBT for the system bandwidth of the downlink or uplink carrier configured for any NR-U cell or the DL or UL BWP configured for the UE of the cell and a method for transmitting downlink control information according thereto. In particular, the present disclosure introduces a method for configuring the UE-group common DCI transmitted through the corresponding PDCCH when the LBT performance result of the subband unit of the base station for downlink transmission is transmitted through the UE-group common PDCCH.

In the present disclosure, a frequency bandwidth that is a unit of LBT for transmission of a base station or a UE in an NR-U cell is referred to as a subband, but the present disclosure is not limited by the name. For example, the frequency bandwidth as a unit of LBT may be referred to as another name, such as a LBT bandwidth or a channel access bandwidth. In addition, in the present disclosure below, an arbitrary value is 'signaled by the base station', 'configured through signaling of the base station', or 'signaled from the base station' means that the corresponding value is configured through the UE-specific or UE-group common or cell-specific RRC signaling, MAC control element signaling (MAC CE signaling), or physical layer control signaling (L1 control signaling). The embodiments of the present disclosure described below may apply individually or in any combination.

Embodiment 1. Method for Configuring Subband

Embodiment 1-1. UE-Specific Configuration

A resource block set (e.g., a subband) may be configured in units of DL or UL BWP configured for an UE. Accordingly, the subband may be implicitly configured according to the configuration information of each BWP for a DL or a UL BWP configured for an UE.

For example, the corresponding subband may be configured based on the frequency resource allocation information and the SCS value in which each BWP is configured. That is, a separate information region for configuring the subband is not defined, and a corresponding subband may be configured as a function of the existing RRC parameter(s) required for any BWP configuration.

Figure 13:
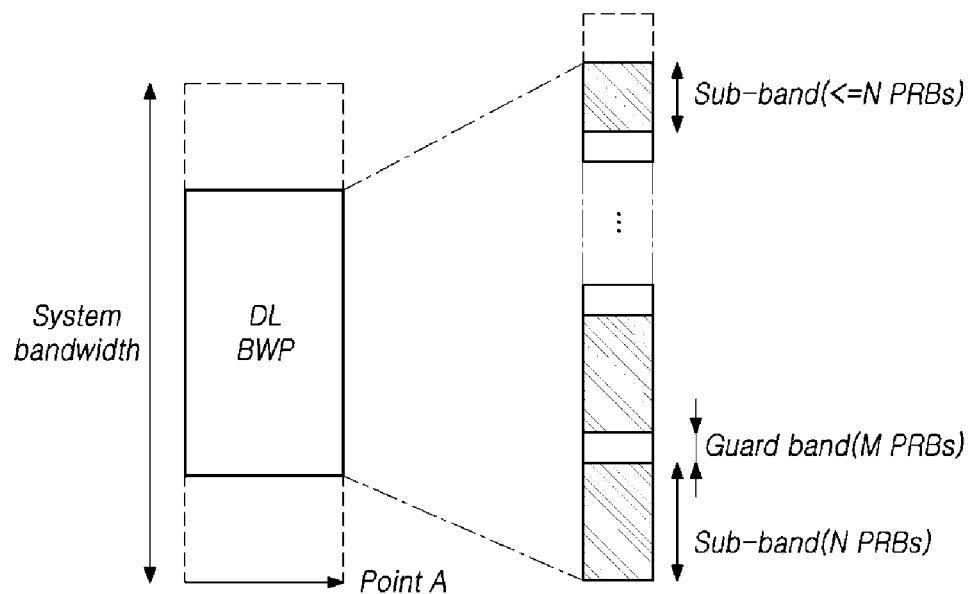
FIGS. 13 and 14 are views illustrating a configuration of a subband for a bandwidth part configured in a UE according to an embodiment.

For example, referring to FIG. 13, a subband according to a BWP configuration may be configured from the lowest PRB of the corresponding BWP. In this case, the number of PRBs in one subband, the value N, may be determined as a function of the SCS value in which the corresponding BWP is configured. Also, according to an embodiment, a guard band may be configured between each subband. In this case, the number of PRBs constituting the corresponding guard band, the M value, may also be determined as a function of the SCS value. However, in this case, the number of PRBs constituting the last subband may be less than the N value.

Figure 14:
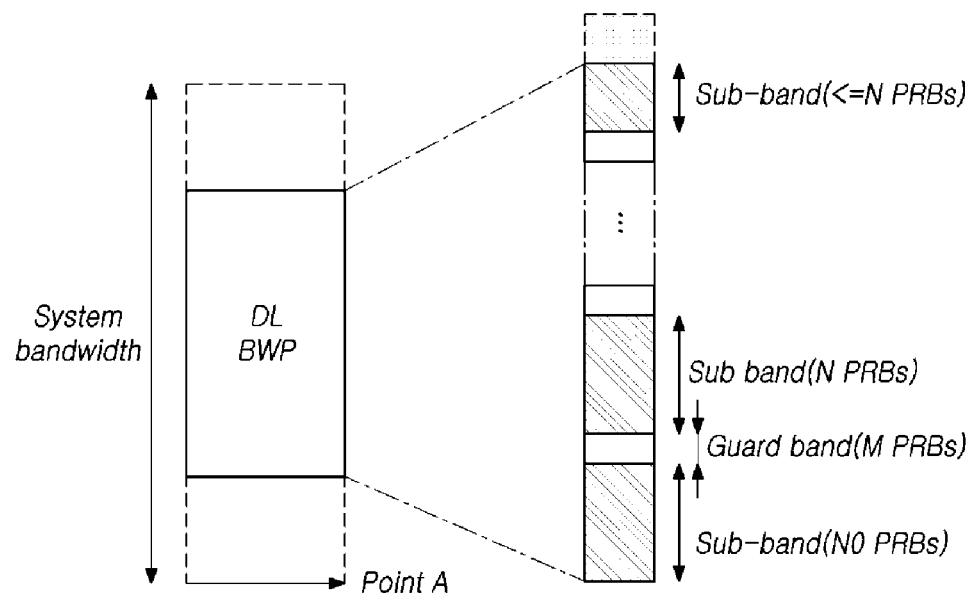

Alternatively, in configuring a subband in any BWP, the lowest subband of the corresponding BWP may be configured to be smaller than the size of the subband such as, the number of N PRBs determined in FIG. 13 as shown in FIG. 14. In this case, the size of the first subband, that is, the number of PRBs, the value N0, may be configured (e.g., indicated or informed) through signaling of the base station. Alternatively, an offset value between the lowest PRB of the second subband and the lowest PRB (e.g., starting PRB, PRB #0) of the BWP may be configured through signaling of the base station.

Additionally, the size of the subband, the N value, or the size of the guard band, the M value, may also be configured through signaling of the base station.

Embodiment 1-2. Cell-Specific or Carrier-Specific Configuration

The subband may be configured in a system bandwidth unit in which the corresponding NR-U cell is configured, or in a carrier bandwidth unit for each neurology regardless of configuration of the bandwidth part (BWP) for an UE. Specifically, the subband may be configured based on a common resource block (CRB) from point A.

Figure 15:
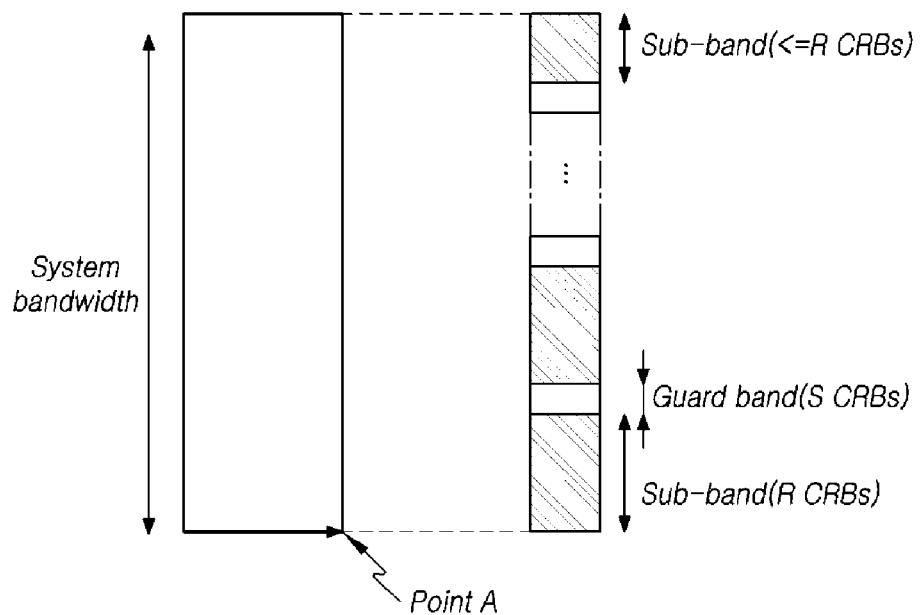
FIG. 15 is a view illustrating a configuration of a subband for a system bandwidth part of a cell in an unlicensed band according to an embodiment.

Referring to FIG. 15, a subband may be configured from the lowest CRB (e.g., CRB 0) configured from point A. In this case, the number of CRBs constituting each subband (i.e., the R value) may be determined by the SCS of the corresponding CRB or may be configured through signaling of the base station. Similarly, a guard band may be configured between each subband, and the number of CRBs constituting the corresponding guard band, the S value, may also be determined by the SCS value of the corresponding CRB or may be configured through signaling of the base station.

Figure 16:
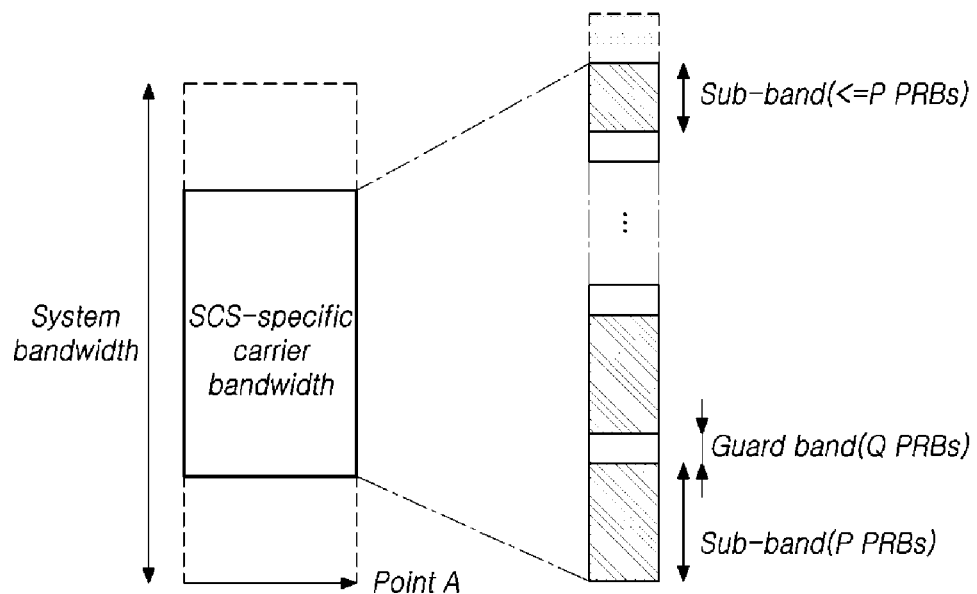
FIGS. 16 and 17 are views illustrating a configuration of a subband for a SCS-specific carrier bandwidth part according to an embodiment.

As shown in FIG. 16, the subband may be configured in a subcarrier spacing-specific (SCS-specific) carrier bandwidth unit. That is, according to the carrier bandwidth configuration information of a subcarrier spacing (SCS), it may be defined that subbands are independently configured within the carrier bandwidth of each SCS.

In this case, the subband of any SCS-specific carrier bandwidth may be configured from the lowest CRB of the corresponding carrier bandwidth. In this case, the size of each subband (i.e., the number of CRBs which is the P value) may be determined by the SCS as described above or may be configured through higher layer signaling. Similarly, a guard band may be configured between each subband, and the number of CRBs constituting the corresponding guard band (i.e., the Q value) may also be determined by the SCS value of the corresponding CRB or may be configured through signaling of the base station. However, in this case, the number of CRBs constituting the last subband may be smaller than the P value.

Figure 17:
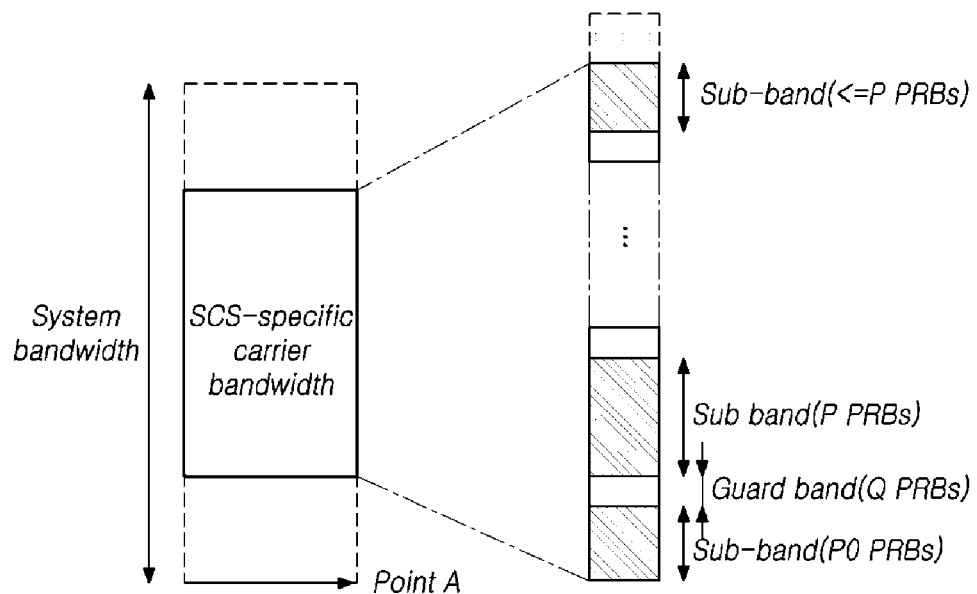

As shown in FIG. 17, the lowest subband in any SCS-specific carrier bandwidth may be configured to be smaller than the size of the subband (e.g., P CRBs) determined in FIG. 16. In this case, the size of the first subband (i.e., the number of CRBs which is the P0 value) may be configured through signaling of the base station. Alternatively, an offset value between the lowest CRB of the second subband and the lowest CRB (e.g., starting CRB) of the corresponding SCS-specific carrier bandwidth may be configured through signaling of the base station.

However, in the above-described examples, the number of PRBs constituting each subband and guard band, that is, N, M, R, S, P, Q values may be different for each subband or guard band.

Additionally, when PDSCH or PUSCH frequency resource allocation for an UE is made across two neighboring subbands according to the subband configuration, that is, including a guard band between the neighboring subbands, transmission through the corresponding guard band may be defined to be performed only when all of the LBTs for the two neighboring subbands are successful.

Embodiment 2. Method for Configuring UE-Group Common DCI

As described above, the base station may transmit the LBT result (e.g., success/failure) for each subband for downlink transmission to the UE through the UE-group common PDCCH. In this case, the LBT result may be transmitted through a bitmap for each subband.

However, since the BWP for an UE is configured to be UE-specific, for UEs receiving the LBT result for each subband from the base station through the same UE-group common DCI, when the frequency configurations of DL BWPs activated for reception are different from each other, ambiguity may occur in interpreting the corresponding UE-group common DCI. That is, in general, since the DL BWP configuration and activation between UEs are not identical, there may need to be defined the method of configuring UE-group common DCI information for indicating the LBT result for each subband and the method interpreting thereof the UE.

As a method for this, the present disclosure introduces a method for defining the bitmap size constituting the UE-group common DCI, the L value, and a location of a bitmap corresponding to a subband configuring a DL BWP to which the UE-group common DCI belongs among the bitmaps of the L bits for an UE.

As a method for this, the bitmap size (i.e., the L value) can be determined by the number of subbands constituting the corresponding DL BWP for each DL BWP configuration for a certain UE according to the method for configuring subband according to the Embodiment 1, the k value. Specifically, the bitmap size of the UE-group common PDCCH transmitted from the base station for the corresponding UE, the L value, may be determined according to the number of subbands constituting the DL BWP activated for a certain UE, the k value. As an example, there may be the corresponding L=k. In this case, the LBT result for each subband constituting the corresponding DL BWP has a 1:1 correspondence with bits of all bitmaps constituting the corresponding UE-group common PDCCH.

As another method, the bitmap size (i.e., the L value) may be determined by the number of subbands constituting the system bandwidth from point A (i.e., the m value). That is, the corresponding L=m may be determined according to the number of subbands constituting the entire system bandwidth constituting an arbitrary NR-U cell (i.e., m value). In this case, the location of the bit(s) corresponding to the subband(s) constituting the DL BWP activated for any UE among the corresponding m-bit bitmaps may be also determined implicitly according to the location of the corresponding DL BWP in the corresponding system bandwidth without separate signaling.

Alternatively, the location information of the corresponding bit(s) may be signaled by the base station. In this case, the parameter for which the corresponding signaling is performed may include offset information from the MSB (Most Significant Bit) or the LSB (Least Significant Bit) constituting the bitmap and bit width information from the corresponding offset. As an example, the corresponding bit width information is not separately signaled, and may be determined by the number of subbands constituting the corresponding DL BWP.

As another method, the corresponding L=n may be determined according to the number of subbands constituting the SCS-specific carrier bandwidth, the n value. In this case, the location of the bit(s) corresponding to the subband(s) constituting the DL BWP activated for any UE among the bitmap of n bits also depends on the location of the DL BWP in the corresponding SCS-specific carrier bandwidth. It can be implicitly determined without separate signaling. Alternatively, the location information of the corresponding bit(s) may be signaled by the base station. In this case, the parameter for the corresponding signaling may include offset information from the MSB or the LSB constituting the bitmap and bit width information from the corresponding offset. Alternatively, the corresponding bit width information is not signaled separately and may be determined by the number of subbands constituting the corresponding DL BWP.

As another method, the bitmap size (i.e., the L value) configured through the corresponding UE-group common DCI and the location information of the bit(s) corresponding to the subband(s) constituting the DL BWP activated in any UE may be signaled by the base station. That is, when configuring the UE-group common DCI transmission for transmitting the LBT result for each subband, the base station, the base station may signal the bitmap size (i.e., the L value), and the location-related information of the bit(s) corresponding to the subband constituting the DL BWP activated in each UE among the bitmaps, that is, offset information from the MSB or LSB of the bitmap and bit width information from the corresponding offset.

Additionally, although the embodiments have been described based on the downlink transmission of the base station, the same concept of the embodiments may be applied to the uplink transmission of the UE.

According to the embodiments described above, it is possible to provide a method and apparatus for configuring one or more subbands in the unlicensed band, and transmitting and receiving the data based on the LBT result for the configured one or more subbands. By so doing, the UE may prevent a reduction in data transmission probability that may arise as the LBT is performed in a wide frequency area and meet the data transmission QoS using the unlicensed band.

Structural configurations of a UE and a base station which may perform all or some of the embodiments described above in connection with FIGS. 1 to 17 are described below with reference to the drawings.

Figure 18:
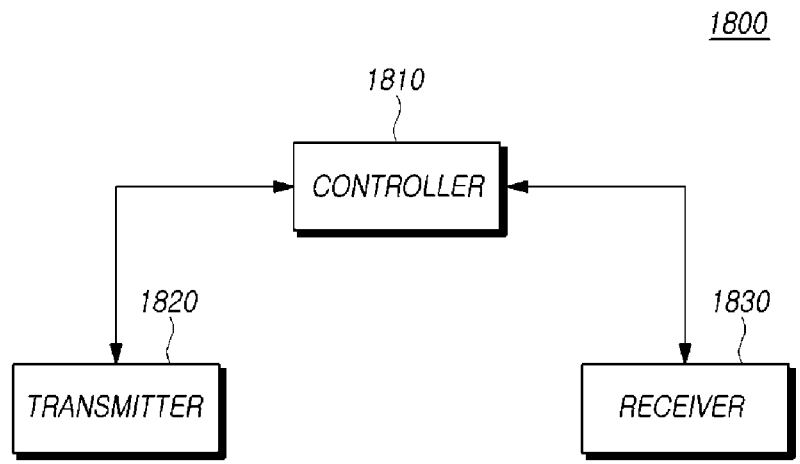
FIG. 18 is a block diagram illustrating a UE according to an embodiment.

FIG. 18 is a diagram illustrating a UE 1800 according to an embodiment.

Referring to FIG. 18, a UE 1800 includes a controller 1810, a transmitter 1820, and a receiver 1830.

The controller 1810 controls the overall operation of the UE 1800 according to the method of transmitting/receiving data in an unlicensed band needed to perform the above-described disclosure. The transmitter 1820 transmits uplink control information and data or messages to the base station via a corresponding channel. The receiver 1830 receives downlink control information and data or messages from the base station via a corresponding channel.

The receiver 1830 may be configured to receive, from the base station, configuration information including a parameter for configuring a plurality of resource block sets in the unlicensed band. According to an embodiment, the configuration of a resource block set (i.e., a subband) may be configured in units of DL BWP or UL BWP configured for an UE. For the BWP configured for the UE, the subband may be implicitly configured according to the configuration information of each BWP. For example, a plurality of subbands constituting each BWP may be configured based on frequency resource allocation information and a subcarrier spacing (SCS) value configured for each BWP.

That is, the configuration information including parameters for configuring a plurality of resource block sets in the unlicensed band may include guard band configuration information for configuring at least one guard band in the unlicensed band. The guard band configuration information may include SCS information of the bandwidth part configured in the unlicensed band. In this case, the guard band configuration information may include SCS information for each of at least one bandwidth part configured for the UE in the unlicensed band. Alternatively, information on the size of the bandwidth part may be further included in the guard band configuration information.

Each of the bandwidth parts configured for the UE may include a plurality of subbands and at least one guard band configured between each subband to distinguish each subband. Accordingly, the number of guard bands included in one bandwidth part is one less than the number of subbands included in the same bandwidth.

According to an embodiment, resource blocks (PRBs) constituting each of at least one guard band may be determined based on the SCS information of a bandwidth part including the guard band. Alternatively, the resource block sets and the resource blocks constituting the guard bands may be determined according to the SCS information of the bandwidth part and the size information of the bandwidth part.

If the number of resource blocks constituting the subband determined based on the SCS information of the bandwidth part and the size information of the bandwidth part is N, each of the plurality of subbands may be composed of N resource blocks. In addition, if the number of resource blocks constituting the guard band determined based on the SCS information of the bandwidth part and the size information of the bandwidth part is M, each of the at least one guard band may include M resource blocks.

The subband composed of N resource blocks and a guard band composed of M resource blocks are alternately configured, and the last subband in the corresponding bandwidth part may be composed of N resource blocks or less resource blocks than N.

According to an embodiment, the number of resource blocks of each of subbands constituting the bandwidth part may be configured by signaling of the base station. That is, the configuration information may include the number of resource blocks constituting a plurality of subbands. In addition, the number of resource blocks constituting the guard band may also be configured by signaling of the base station.

Alternatively, the number of resource blocks constituting the guard band and the index of the starting resource block, which is the lowest resource block among the resource blocks constituting each guard band, are configured by the signaling of the base station, and accordingly, the subband may be configured between the guard bands.

According to another embodiment, the subband configuration may be configured in a system bandwidth unit in which the corresponding NR-U cell is configured, or in a carrier bandwidth unit for each numerology, regardless of the bandwidth part configuring for any UE. For example, the subband configuration may be configured based on a common resource block (CRB) from point A of the system bandwidth.

In this case, the guard band configuration information may include SCS information of the system bandwidth configured in the unlicensed band. Alternatively, the guard band configuration information may further include information on the size of the system bandwidth. Alternatively, according to another embodiment the guard band configuration information may include the subcarrier spacing information of a subcarrier spacing specific (SCS-specific) carrier bandwidth. Alternatively, the guard band configuration information may further include information on the size of the corresponding bandwidth.

According to an embodiment, the common resource blocks constituting each of at least one guard band may be determined based on the SCS information of a system bandwidth. Alternatively, the common resource blocks constituting each of the at least one guard band may be determined based on the SCS information of the system bandwidth and the size of the system bandwidth.

If the number of common resource blocks constituting the subband determined based on the SCS information of the system bandwidth is R, each of the plurality of subbands may be composed of R common resource blocks. In addition, if the number of common resource blocks constituting the guard band determined based on the SCS information of the system bandwidth is S, each of the at least one guard band may be composed of S common resource blocks.

Alternatively, according to an embodiment, the number of resource blocks of each of subbands constituting the system bandwidth may be configured by signaling of the base station. That is, the configuration information may include the number of resource blocks constituting a plurality of subbands. In addition, the number of resource blocks constituting the guard band may also be configured by signaling of the base station.

Alternatively, the number of the common resource blocks constituting the guard band and the index of the starting common resource block, which is the lowest common resource block among common resource blocks constituting each guard band, may be configured by the signaling of the base station. That is, the number of starting common resource blocks and resource blocks of at least one guard band within the system bandwidth may be indicated according to the RRC signaling or the like. Accordingly, a plurality of subbands may be configured between each guard band.

According to another embodiment, resource blocks constituting each of at least one guard band may be determined based on the SCS information of an SCS-specific carrier bandwidth. Alternatively, the resource blocks constituting each of the at least one guard band may be determined based on the SCS information of the SCS-specific carrier bandwidth and the size of the SCS-specific carrier bandwidth.

If the P value is the number of resource blocks constituting a subband determined based on the SCS information of the SCS specific carrier bandwidth, each of the plurality of subbands may be composed of P resource blocks. In addition, if the number of resource blocks constituting a guard band determined based on the SCS information of the SCS-specific carrier bandwidth is Q, each of at least one guard band may be composed of Q resource blocks.

Alternatively, the number of resource blocks constituting the guard band and the index of the starting resource block, which is the lowest resource block among the resource blocks constituting each guard band, may be configured by the signaling of the base station. That is, the number of starting resource blocks and resource blocks of at least one guard band within the SCS specific carrier bandwidth may be indicated according to the RRC signaling or the like. Accordingly, a plurality of subbands may be configured between each guard band.

The controller 1810 may be configured to check the plurality of resource block sets based on the configuration information.

When a plurality of subbands are configured based on the SCS information of the bandwidth part configured for the UE, the controller 1810 may acquire the SCS information of the bandwidth part included in the configuration information. The UE may check the number of resource blocks constituting the subband or the guard band, respectively, based on the corresponding SCS information. Accordingly, the controller 1810 may configure the plurality of subbands for the activated bandwidth part based on the corresponding number of resource blocks.

This can be equally applied even when the number of resource blocks constituting a subband or a guard band is determined based on the SCS information of the system bandwidth or the SCS specific carrier bandwidth.

When the number of resource blocks constituting the subband or guard band and the index of the starting resource block are configured by the signaling of the base station, the UE may check the resource blocks constituting each of the subband and the guard band included in the configuration information.

The receiver 1830 may transmit/receive data to and from the base station through at least one resource block set determined based on a result of performing a Listen Before Talk (LBT) operation for each of the plurality of resource block sets received from the base station.

As described above, when the plurality of subbands are configured for any one of the bandwidth part, the system bandwidth, or the SCS-specific carrier bandwidth, the base station may perform the LBT in units of the corresponding subbands. That is, in the present disclosure, the subband may mean an LBT bandwidth corresponding to a unit in which the LBT operation is performed on the frequency axis or domain. Accordingly, resource allocation for DL BWP and transmission/reception of PDCCH or PDSCH may be performed on a per-subband basis.

The base station may perform the LBT operation for each of a plurality of subbands and configure a bitmap indicating the LBT performance result. That is, the base station may transmit the LBT result (e.g., success/failure) for each subband for downlink transmission to the UE through a UE-group common PDCCH. The UE may receive downlink control information including the corresponding bitmap from the base station.

In this case, the size of the bitmap may be determined based on the number of subbands. For example, it is assumed that the bitmap constituting the UE-group common DCI consists of L bits.

When the plurality of subbands are configured for the bandwidth part, the L value may be determined by the number of subbands constituting the corresponding BWP for each BWP set for the UE, the k value. For example, the LBT result for each subband may be indicated in a 1:1 correspondence with the bits of the corresponding bitmap. That is, it may be determined as L=k.

When the plurality of subbands are configured for the system bandwidth, the L value may be determined by the number of subbands constituting the system bandwidth from point A, the m value. For example, the LBT result for each subband may be indicated in a 1:1 correspondence with the bits of the corresponding bitmap. That is, it may be determined as L=m.

When the plurality of subbands are configured for the SCS-specific carrier bandwidth, the L value may be determined by the number of subbands constituting the SCS-specific carrier bandwidth, the n value. For example, the LBT result for each subband may be indicated in a 1:1 correspondence with the bits of the corresponding bitmap. That is, it may be determined as L=n.

Alternatively, according to another embodiment, the bitmap size configured through the corresponding UE-group common DCI, the L value, and the location information of bits corresponding to the plurality of subbands configured for the UE may be all signaled by the base station.

The receiver 1830 may receive scheduling information for at least one subband resource determined based on the LBT performance result from the base station. The UE may receive downlink data from the base station or transmit uplink data to the base station based on the corresponding scheduling information.

According to an embodiment, it will be assumed that there is allocated a resource for transmission and reception of data in a frequency band including one guard band among at least one guard band and two resource block sets having one guard band among a plurality of resource block sets therebetween so that each of the plurality of resource block sets is distinguished in the unlicensed band. That is, resource allocation for data transmission/reception may be performed for a band including two subbands and a guard band therebetween. In this case, the transmitter 1820 and the receiver 1830 may transmit and receive the data with the base station in the frequency band only when the LBT operation for the two resource block sets is all successful. That is, only when the LBT result for the two subbands interposed between the guard bands is successful, data transmission and reception may be performed through the corresponding guard bands.

According to the above-mentioned embodiments, it is possible to provide a method and apparatus for configuring one or more subbands in the unlicensed band and transmitting and receiving the data based on the LBT result for the configured one or more subbands. By so doing, the UE may prevent a reduction in data transmission probability that may arise as the LBT operation is performed in a wide frequency area and meet the data transmission QoS using the unlicensed band.

Figure 19:
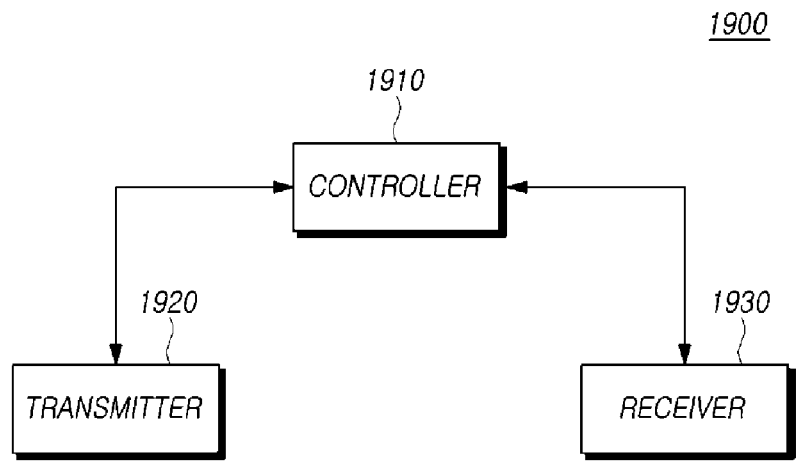
FIG. 19 is a block diagram illustrating a base station according to an embodiment.

FIG. 19 is a block diagram illustrating a base station 1900 according to an embodiment.

Referring to FIG. 19, a base station 1900 includes a controller 1910, a transmitter 1920, and a receiver 1930.

The controller 1910 controls the overall operation of the base station 1900 according to the method of receiving uplink control information in an unlicensed band needed to perform the above-described disclosure. The transmitter 1920 and the receiver 1930 are used to transmit or receive signals or messages or data necessary for performing the above-described disclosure, with the UE.

The transmitter 1920 may be configured to transmit configuration information including a parameter for configuring a plurality of resource block sets in the unlicensed band.

According to an embodiment, the configuration of a resource block set (i.e., a subband) may be configured in units of DL BWP or UL BWP configured for an UE. For the BWP configured for the UE, the subband may be implicitly configured according to the configuration information of each BWP. For example, a plurality of subbands constituting each BWP may be configured based on frequency resource allocation information and a subcarrier spacing (SCS) value configured for each BWP.

That is, the configuration information including parameters for configuring a plurality of resource block sets in the unlicensed band may include guard band configuration information for configuring at least one guard band in the unlicensed band. The guard band configuration information may include SCS information of the bandwidth part configured in the unlicensed band. In this case, the guard band configuration information may include SCS information for each of at least one bandwidth part configured for the UE in the unlicensed band. Alternatively, information on the size of the bandwidth part may be further included in the guard band configuration information.

Each of the bandwidth parts configured for the UE may include a plurality of subbands and at least one guard band configured between each subband to distinguish each subband. Accordingly, the number of guard bands included in one bandwidth part is one less than the number of subbands included in the same bandwidth.

According to an embodiment, resource blocks (PRBs) constituting each of at least one guard band may be determined based on the SCS information of a bandwidth part including the guard band. Alternatively, the resource block sets and the resource blocks constituting the guard bands may be determined according to the SCS information of the bandwidth part and the size information of the bandwidth part.

If the number of resource blocks constituting the subband determined based on the SCS information of the bandwidth part and the size information of the bandwidth part is N, each of the plurality of subbands may be composed of N resource blocks. In addition, if the number of resource blocks constituting the guard band determined based on the SCS information of the bandwidth part and the size information of the bandwidth part is M, each of the at least one guard band may include M resource blocks.

According to an embodiment, the number of resource blocks of each of subbands constituting the bandwidth part may be configured by signaling of the base station. That is, the configuration information may include the number of resource blocks constituting a plurality of subbands. In addition, the number of resource blocks constituting the guard band may also be configured by signaling of the base station.

Alternatively, the number of resource blocks constituting the guard band and the index of the starting resource block, which is the lowest resource block among the resource blocks constituting each guard band, are configured by the signaling of the base station. Accordingly, the subband may be configured between the guard bands.

According to another embodiment, the subband configuration may be configured in a system bandwidth unit in which the corresponding NR-U cell is configured, or in a carrier bandwidth unit for each numerology, regardless of the bandwidth part configuring for any UE. For example, the subband configuration may be configured based on a common resource block (CRB) from point A of the system bandwidth.

In this case, the guard band configuration information may include SCS information of the system bandwidth configured in the unlicensed band. Alternatively, the guard band configuration information may further include information on the size of the system bandwidth. Alternatively, according to another example, the guard band configuration information may include the subcarrier spacing information of a subcarrier spacing specific (SCS-specific) carrier bandwidth. Alternatively, the guard band configuration information may further include information on the size of the corresponding bandwidth.

According to an embodiment, the common resource blocks constituting each of at least one guard band may be determined based on the SCS information of a system bandwidth. Alternatively, the common resource blocks constituting each of the at least one guard band may be determined based on the SCS information of the system bandwidth and the size of the system bandwidth.

If the number of common resource blocks constituting the subband determined based on the SCS information of the system bandwidth is R, each of the plurality of subbands may be composed of R common resource blocks. In addition, if the number of common resource blocks constituting the guard band determined based on the SCS information of the system bandwidth is S, each of the at least one guard band may be composed of S common resource blocks.

Alternatively, according to an embodiment, the number of resource blocks of each of the subbands constituting the system bandwidth may be configured by signaling of the base station. That is, the configuration information may include the number of resource blocks constituting a plurality of subbands. In addition, the number of resource blocks constituting the guard band may also be configured by signaling of the base station.

Alternatively, the number of the common resource blocks constituting the guard band and the index of the starting common resource block, which is the lowest common resource block among common resource blocks constituting each guard band, may be configured by the signaling of the base station. That is, the number of starting common resource blocks and resource blocks of at least one guard band within the system bandwidth may be indicated according to the RRC signaling or the like. Accordingly, a plurality of subbands may be configured between each guard band.

According to another embodiment, resource blocks constituting each of at least one guard band may be determined based on the SCS information of an SCS-specific carrier bandwidth. Alternatively, the resource blocks constituting each of the at least one guard band may be determined based on the SCS information of the SCS-specific carrier bandwidth and the size of the SCS-specific carrier bandwidth.

If P is the number of resource blocks constituting a subband determined based on the SCS information of the SCS specific carrier bandwidth, each of the plurality of subbands may be composed of P resource blocks. In addition, if the number of resource blocks constituting a guard band determined based on the SCS information of the SCS-specific carrier bandwidth is Q, each of at least one guard band may be composed of Q resource blocks.

Alternatively, according to an embodiment, the number of resource blocks of each of a plurality of subbands constituting the SCS-specific carrier bandwidth may be configured by signaling of the base station. That is, the configuration information may include the number of resource blocks constituting a plurality of subbands. In addition, the number of resource blocks constituting the guard band may also be configured by signaling of the base station.

Alternatively, the number of resource blocks constituting the guard band and the index of the starting resource block, which is the lowest resource block among the resource blocks constituting each guard band, may be configured by the signaling of the base station. That is, the number of starting resource blocks and resource blocks of at least one guard band within the SCS specific carrier bandwidth may be indicated according to the RRC signaling or the like. Accordingly, a plurality of subbands may be configured between each guard band.

The transmitter 1920 may transmit a result of performing a Listen Before Talk (LBT) operation for each of the plurality of resource block sets.

As described above, when the plurality of subbands are configured for any one of the bandwidth part, the system bandwidth, or the SCS-specific carrier bandwidth, the base station may perform the LBT operation in units of the corresponding subbands. That is, in the present disclosure, the subband may mean an LBT bandwidth corresponding to a unit in which the LBT is performed on the frequency axis or domain.

As described above, in order to transmit a radio signal from any node in the unlicensed band, the LBT process for checking whether the radio channel is occupied by another node may be preferentially performed. Accordingly, in order to transmit a PDSCH for a UE in the NR-U cell of the unlicensed band configured by a certain NR base station, the base station must perform the LBT for the frequency band in which the NR-U cell is configured. As a result of performing the LBT, when the radio channel of the unlicensed band is empty, the base station may transmit the PDCCH and the PDSCH accordingly to the UE.

For example, the controller 1910 may perform the LBT for each of a plurality of subbands and configure a bitmap indicating the LBT performance result. That is, the base station may transmit the LBT result (e.g., success/failure) for each subband for downlink transmission to the UE through a UE-group common PDCCH. The UE may receive downlink control information including the corresponding bitmap from the base station.

In this case, the size of the bitmap may be determined based on the number of a plurality of subbands. For example, it is assumed that the bitmap constituting the UE-group common DCI consists of L bits.

When the plurality of subbands are configured for the bandwidth part, the L value may be determined by the number of subbands constituting the corresponding BWP for each BWP set for the UE, the k value. For example, the LBT result for each subband may be indicated in a 1:1 correspondence with the bits of the corresponding bitmap. That is, it may be determined as L=k.

When the plurality of subbands are configured for the system bandwidth, the L value may be determined by the number of subbands constituting the system bandwidth from point A, the m value. For example, the LBT result for each subband may be indicated in a 1:1 correspondence with the bits of the corresponding bitmap. That is, it may be determined as L=m.

When the plurality of subbands are configured for the SCS-specific carrier bandwidth, the L value may be determined by the number of subbands constituting the SCS-specific carrier bandwidth, the n value. For example, the LBT result for each subband may be indicated in a 1:1 correspondence with the bits of the corresponding bitmap. That is, it may be determined as L=n.

Alternatively, according to another embodiment, the bitmap size and the L value configured through the corresponding UE-group common DCI and the location information of bits corresponding to the plurality of subbands configured for the UE may be all signaled by the base station.

The transmitter 1920 may transmit the data to the UE through at least one resource block set determined based on the result of performing the LBT. The transmitter 1920 may transmit, to the UE, scheduling information for at least one subband resource determined based on the LBT performance result from the base station. That is, the transmitter 1920 may transmit downlink data through at least one subband in which the LBT operation is successful. The base station may transmit the downlink data to the UE based on the corresponding scheduling information.

The receiver 1920 may receive the data from the UE through at least one resource block set determined based on the result of performing the LBT. The receiver 1920 may receive the data from the UE according to the scheduling information for at least one subband resource determined based on the LBT performance result.

According to the above-mentioned embodiment, it is possible to provide a method and apparatus for configuring one or more subbands in the unlicensed band and transmitting and receiving the data based on the LBT result for the configured one or more subbands. By so doing, the UE may prevent a reduction in data transmission probability that may arise as the LBT is performed in a wide frequency area and meet the data transmission QoS using the unlicensed band.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for transmitting/receiving data in an unlicensed band by a user equipment (UE), the method comprising:
receiving configuration information comprising a parameter for configuring a plurality of resource block sets in the unlicensed band;
checking the plurality of resource block sets in the unlicensed band based on the configuration information; and
transmitting/receiving data to and from a base station through at least one resource block set determined based on a result of performing a Listen Before Talk (LBT) operation for each of the plurality of resource block sets received from the base station,
wherein when the configuration information comprises guard band configuration information for configuring at least one guard band in the unlicensed band, the plurality of resource block sets are configured to be distinguished from each other by the at least one guard band configured according to the guard band configuration information; and
when the configuration information does not comprise the guard band configuration information in the unlicensed band, the plurality of resource block sets are configured based on a number of resource blocks constituting the at least one guard band is determined based on subcarrier spacing information of a system bandwidth.

2. The method of claim 1, wherein the guard band configuration information comprises a starting common resource block (CRB) of the at least one guard band and a number of resource blocks constituting the at least one guard band.

3. A method for transmitting/receiving data in an unlicensed band by a base station, the method comprising:
transmitting configuration information comprising a parameter for configuring a plurality of resource block sets in the unlicensed band;
transmitting a result of performing a Listen Before Talk (LBT) operation for each of the plurality of resource block sets; and
transmitting/receiving the data to and from a user equipment (UE) through at least one resource block set determined based on the result of performing the LBT operation,
wherein when the configuration information comprises guard band configuration information for configuring at least one guard band in the unlicensed band, the plurality of resource block sets are configured to be distinguished from each other by the at least one guard band configured according to the guard band configuration information; and
when the configuration information does not comprise the guard band configuration information in the unlicensed band, the plurality of resource block sets are configured based on a number of resource blocks constituting the at least one guard band is determined based on subcarrier spacing information of a system bandwidth.

4. The method of claim 3, wherein the guard band configuration information comprises a starting common resource block (CRB) of the at least one guard band and the number of resource blocks constituting the at least one guard band.

5. A user equipment (UE) for transmitting/receiving data in an unlicensed band, the UE comprising:
a transmitter configured to transmit data to a base station;
a receiver configured to receive, from the base station, configuration information comprising a parameter for configuring a plurality of resource block sets in the unlicensed band; and
a controller configured to check the plurality of resource block sets in the unlicensed band based on the configuration information,
wherein the receiver receives the data from the base station through at least one resource block set determined based on a result of performing a Listen Before Talk (LBT) operation for each of the plurality of resource block sets received from the base station, and the transmitter transmits the data to the base station through the at least one resource block set,
wherein when the configuration information comprises guard band configuration information for configuring at least one guard band in the unlicensed band, the plurality of resource block sets are configured to be distinguished from each other by the at least one guard band configured according to the guard band configuration information; and
when the configuration information does not comprise the guard band configuration information in the unlicensed band, the plurality of resource block sets are configured based on a number of resource blocks constituting the at least one guard band is determined based on subcarrier spacing information of a system bandwidth.

6. The UE of claim 5, wherein the guard band configuration information comprises a starting common resource block (CRB) of the at least one guard band and a number of resource blocks constituting the at least one guard band.

* * * * *